United States Patent
Morishige et al.

(10) Patent No.: US 8,050,218 B2
(45) Date of Patent: Nov. 1, 2011

(54) MOBILE COMMUNICATIONS SYSTEM PDIF AND METHOD FOR PEER DETECTION OF MOBILE TERMINAL

(75) Inventors: Takehiro Morishige, Kawasaki (JP); Masashi Takatsuki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 903 days.

(21) Appl. No.: 12/073,758

(22) Filed: Mar. 10, 2008

(65) Prior Publication Data
US 2008/0310347 A1 Dec. 18, 2008

(30) Foreign Application Priority Data
Jun. 18, 2007 (JP) .................. 2007-159893

(51) Int. Cl.
*H04W 4/00* (2009.01)

(52) U.S. Cl. ...................... 370/328; 370/342; 455/67.11

(58) Field of Classification Search .................. 370/328, 370/342; 455/67.11, 422, 414, 552.1
See application file for complete search history.

(56) References Cited

U.S. PATENT DOCUMENTS

| | | | |
|---|---|---|---|
| 7,761,087 B2 * | 7/2010 | Kharia et al. ............... | 455/414.1 |
| 2006/0217147 A1 * | 9/2006 | Olvera-Hernandez et al. .......................... | 455/552.1 |
| 2008/0101314 A1 * | 5/2008 | Bachmutsky ................ | 370/342 |
| 2009/0111458 A1 * | 4/2009 | Fox et al. .................... | 455/422.1 |
| 2010/0313024 A1 * | 12/2010 | Weniger et al. ............... | 713/170 |

FOREIGN PATENT DOCUMENTS
JP 2003-169379 12/2001
* cited by examiner

*Primary Examiner* — Albert T Chou
(74) *Attorney, Agent, or Firm* — Crowell & Moring LLP

(57) ABSTRACT

With a system having no paging function, dead peer detection control and cutoff of a session are implemented as is the case with a system having a paging function. There is provided a method for dead peer detection of a mobile terminal, to be executed in a mobile communications system including a mobile terminal connected to plural wireless systems, a first connection device terminating a first wireless system with access points managing a connection status between the mobile terminal and a wireless link, and a second connection device terminating a second wireless system with access points not managing a connection status between the mobile terminal and a wireless link, said method comprising the steps of the second connection device acquiring the connection status of the mobile terminal in the first wireless system from the first connection device, and the second connection device changing a dead peer detection control process on the basis of the connection status of the mobile terminal, as acquired.

15 Claims, 21 Drawing Sheets

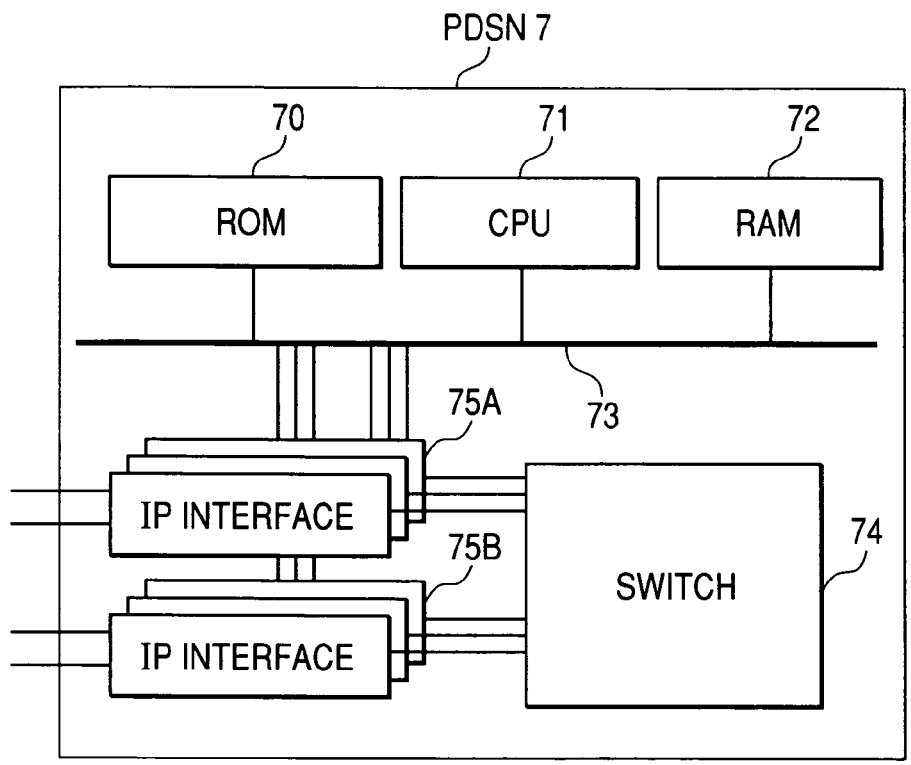

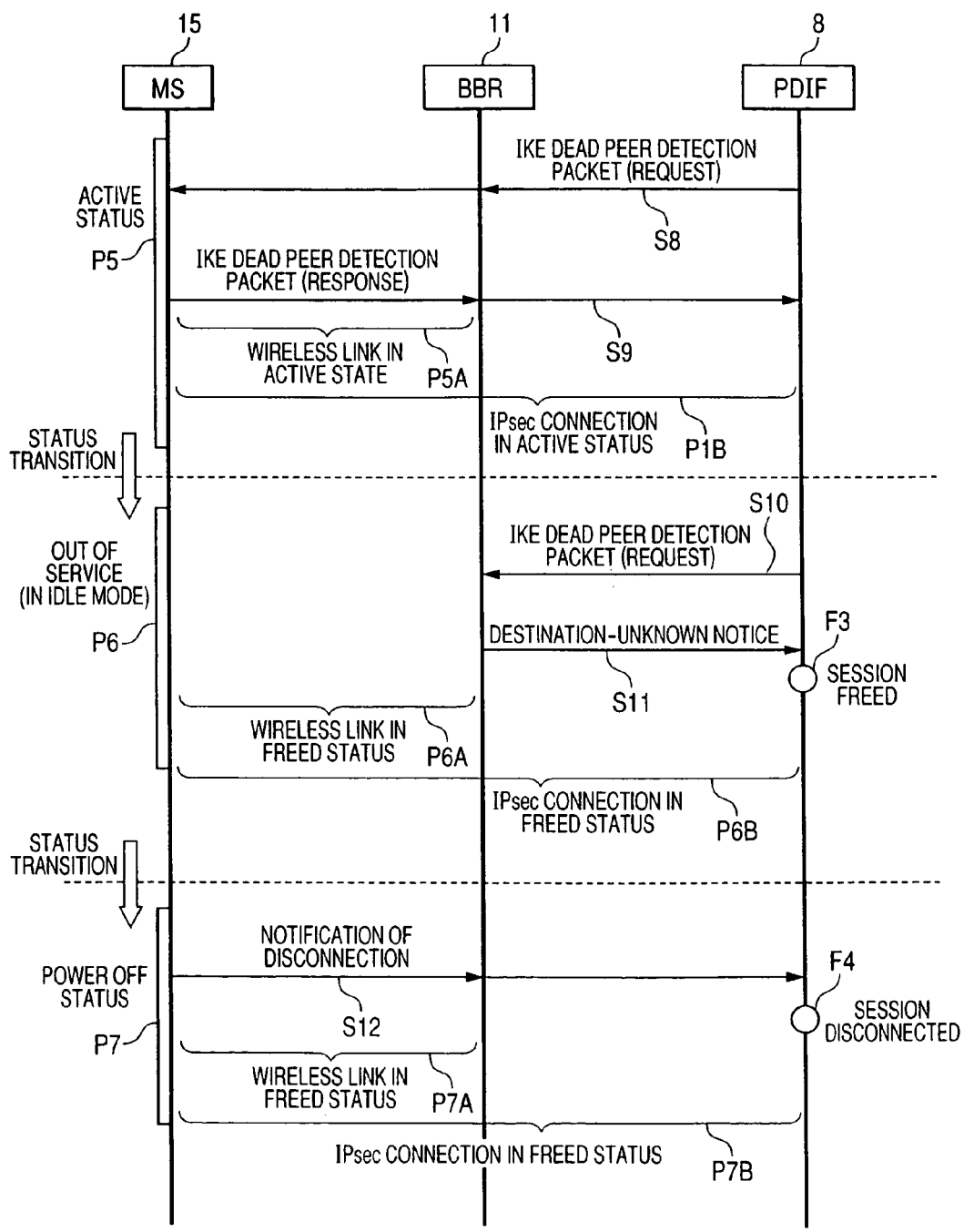

MOBILE COMMUNICATIONS SYSTEM PDIF AND METHOD FOR PEER DETECTION OF MOBILE TERMINAL

CLAIM OF PRIORITY

The present application claims priority from Japanese application JP 2007-159893 filed on Jun. 18, 2007, the content of which is hereby incorporated by reference to into this application.

FIELD OF THE INVENTION

The invention relates to a method for dead peer detection of a mobile terminal in a mobile communications system integrating plural wireless communication systems together, and in particular, to dead peer detection control of the mobile terminal in order to select the method for the dead peer detection, optimum to a connection status of the mobile terminal.

BACKGROUND OF THE INVENTION

As the broadband Internet service, and the third generation cellular phone have lately come into widespread use to be accompanied by expansion in needs for transmission of data large in capacity in the mobile communications system, such as, for example, downloading of music, it is highly hoped that a high-speed and large-capacity data transmission system employing a broadband wireless access technology, such as WiFi, and WIMAX, and so forth, in addition to the cellular wireless system, can be implemented.

3GPP (3rd Generation Partnership Project), and 3GPP 2 (3rd Generation Partnership Project 2), as the standardization group of the third generation cellular phone, have standardized a public cellular phone network technology for an ALL-IP network called IMS (IP Multimedia Subsystem)/MMD (Multimedia Domain). Further, in order to materialize the high-speed and large-capacity data transmission system, the 3GPP, and 3GPP 2 promote standardization by means of 3G Service FMC (Fixed Mobile Convergence) via a WiFi access. The mobile communications system is capable of turning a mobile communications foundation adapted to the ALL-IP by virtue of the 3G Service FMC via the WiFi access. Accordingly, it is possible to implement reduction in cost, and fusion between fixed network communications, and mobile communications. Furthermore, it is possible for a mobile terminal to select optimum communication means according to a location or a state of the mobile terminal.

Since mobile terminals each employing plural communication systems in execution of communication are connected to the mobile communications system, as described in the foregoing, there are needs for flexible execution of various controls, such as charge control, access control, and so forth, owing to diversity in access form.

Further, power is normally supplied to a mobile terminal from a battery, so that the mobile terminal seems to have difficulty with communication for long hours, however, a mobile terminal employed in a cellular wireless system represented by an EVDO system has an idle mode function for temporarily freeing a wireless link while maintaining connection thereof with the Internet if transmission/receipt of data cannot be implemented for a given time length or radio wave signals are weak, during communication, thereby reducing power consumption by virtue of reduction in power consumption of the mobile terminal.

Nevertheless, a mobile terminal connectable to plural mobile communications networks has plural wireless receivers mounted therein, resulting in an increase in power consumption, so that use of the mobile terminal for many hours will pose a problem. According to a technology disclosed in JP-A No. 2003-169379, it is described that in the case where it becomes necessary for a wireless receiver of a wireless system, in non-communicating status or in a status requiring no communication, to communicate with a mobile terminal upon, for example, arrival of an incoming call using a packet to the mobile terminal, the mobile terminal is connected again to an access network by means of a paging function whereby a paging notice including a request for startup of a specified wireless receiver is transmitted from a base station of another wireless system. In the case of using this technology, however, since connection between an access gateway device and the mobile terminal is cut off, there is the need for establishing again the connection between the mobile terminal, and the access gateway device although it is possible to obtain a significant effect of reduction in the power consumption of the mobile terminal. In the case where a service assuming constant connection is provided, in particular, there remains a problem of deterioration in connectability owing to the needs for connecting the mobile terminal to the access network again.

Now, there will be described hereinafter a problem with the access gateway device installed in the mobile communications system. The access gateway device executes access authentication of a mobile terminal to be connected, packet transmission, and so forth, however, there are times when the connection of the access gateway device with the mobile terminal is not correctly freed owing to a change in wireless network status, or power-off due to sudden battery exhaustion. Accordingly, the access gateway device normally monitors the connection status of the mobile terminal by periodically transmitting and receiving a dead peer detection packet in order to check the connection status of the mobile terminal.

A procedure for dead peer detection in a cellular wireless system is specifically described hereinafter with reference to FIG. 22.

FIG. 22 is a view showing a sequence of steps of the procedure for the dead peer detection in a conventional cellular wireless system.

In the figure, MS (Mobile Station) 15 is a mobile terminal connected to a cellular wireless system. PCF (Packet Control Function) 10 is a base station of the EVDO system. Further, PDSN (Packet Data Serving Node) 7 is an access gateway device of the cellular wireless system.

PDSN 7 manages a session with MS 15 by use of PPP (Point-to-Point Protocol).

First, PDSN 7 transmits a dead peer detection packet to MS 15 by use of PPP (step S1).

Next, if MS 15 is in an active status (P1), MS 15 transmits a response packet against the dead peer detection packet as received in the step S1 to PDSN 7 (step S2). Upon receipt of the response packet, PDSN 7 determines that MS 15 is in an enable status of transmitting and receiving data, thereby maintaining the session with MS 15.

Subsequently, if the status of MS 15 makes transition to an out-of-service mode or an idle mode, PDSN 7 transmits the dead peer detection packet to PCF 10 (step S3). Since a wireless link with MS 15 is in a released status (P2A), PCF 10 transmits a paging notice to MS 15 after receiving the dead peer detection packet to MS 15 from PDSN 7. More specifically, PCF 10 transmits a signal to MS 15, advising MS 15 to the effect that an incoming packet has arrived.

Next, if the status of MS 15 is the out-of-service mode, PCF 10 transmits an out-of-service notice to PDSN 7 (this step is not shown in the figure), whereupon PDSN 7 cuts off the session with MS 15 (F1). On the other hand, if MS 15 is an idle mode status, PCF 10 transmits the paging notice to MS 15 in step S4, thereby causing MS 15 to make transition to the active status (P3). Then, PCF 10 transfers the dead peer detection packet received from PDSN 7 to MS 15 (step S5).

Subsequently, MS 15 transmits a response packet against the dead peer detection packet as received to PDSN 7 (step S6). If PDSN 7 receives the response packet from MS 15, PDSN 7 determines that MS 15 is in the enable status of transmitting and receiving data, thereby maintaining the session with MS 15.

Next, if MS 15 has turned power supply OFF (P4), MS 15 first transmits a power-off notice to PDSN 7 (S7). Upon receipt of the power-off notice from MS 15, PDSN 7 frees the session with the relevant MS 15 (F2). As a result of the session between PDSN 7 and the MS 15 being freed, the wireless link between PCF 10 and the MS 15 will be in the released status (P4A).

As described above, because the cellular wireless system is a system having the paging function whereby the paging notice including the request for startup of a specified mobile terminal is transmitted from a base station of a wireless system, it is possible to activate a mobile terminal when the mobile terminal is in an idle mode status, and dead peer detection control is executed, and PDSN can detect a connection status between the mobile terminal and the wireless link from the notice from PCF. Accordingly, with the EVDO system, it is possible to determine that the mobile terminal is in an inactive status if radio waves cannot be received as in the case of the mobile terminal being in the power-off status, or in the out-of-service status, and to determine that the mobile terminal is in a live status in the case of the mobile terminal being in the active status or in the idle mode status.

Next, a procedure for dead peer detection in a wireless LAN system is described hereinafter.

FIG. 23 is a view showing a sequence of steps of the procedure for dead peer detection in a conventional wireless LAN system.

In the figure, MS 15 is a mobile terminal connected to a wireless LAN system. BBR (Broad Band Router) 11 is a broadband router in the wireless LAN system. Further, PDIF (Packet Data Interworking Function) 8 is an access gateway device in the wireless LAN system.

PDIF 8 manages a session with MS 15 by use of IPsec SA (Security Associate). IPsec SA is generated by use of IKE (Internet Key Exchange) at the time of actuating MS 15. Dead peer detection control in the wireless LAN system is implemented by use of the standard function of IKE.

First, PDIF 8 transmits a dead peer detection packet to MS 15 by use of IKE (step S8).

Next, if MS 15 is in the active status (P5), MS 15 transmits a response packet against the dead peer detection packet as received in the step S8 to PDIF 8 (step S9). Upon receipt of the response packet from MS 15, PDIF 8 determines that MS 15 is live, thereby maintaining the session with MS 15.

Then, if PDIF 8 transmits the dead peer detection packet to BBR 11 (step S10) in the case where MS 15 is in the out-of-service mode (P6), BBR 11 transmits a destination-unknown notice to PDIF 8 (step S11) since a wireless link between BBR 11 and MS 15 is cut off. Upon receipt of the destination-unknown notice from BBR 11, PDIF 8 frees its session with MS 15. Upon freeing of the session between PDIF 8 and MS 15, TPsec connection will be in a freed status (P6B).

Next, if MS 15 has turned power supply OFF (P7), MS 15 transmits a power-off notice to PDIF 8 (step S12) as in the case of the EVDO system. Upon receipt of the power-off notice from MS 15, PDIF 8 frees its session with MS 15 (F4). Upon freeing of the session between PDIF 8 and MS 15, the wireless link between BBR 11 and MS 15 will be in a released status (P7A).

Thus, because the wireless LAN system is a system that does not have the paging function, it is not possible with this system to activate the mobile terminal when the dead peer detection control is executed if the mobile terminal is in the idle mode status. Further, PDIF is unable to detect a connection status of the mobile terminal with the wireless link either. In consequence, it is determined with the wireless LAN system that the mobile terminal is in the live status only when the same is in the active status.

SUMMARY OF THE INVENTION

As described hereinbefore, the access gateway device (PDSN) of the cellular wireless system representative of wireless systems having the paging function is capable of monitoring a connection status of the mobile terminal, in detail, such as the idle mode status thereof, the out-of-service mode status thereof, and so forth, so that adequate cutoff of a session is enabled by the dead peer detection control according to the connection status.

More specifically, with the cellular wireless system, a control protocol is predefined between the mobile terminal and an AP (access point), between the AP and PCF, and between PCF and PDSN, and in the case of a wireless link being established between the mobile terminal and the AP, a connection status of the wireless link as established is exchanged between the AP and PCF. PCF in the cellular wireless system manages a connection status between the mobile terminal and the wireless link, notifying PDSN of a connection status of the wireless link established between the mobile terminal and the AP. If the mobile terminal turned into the idle mode status, the wireless link between the mobile terminal and the AP is freed. In the case of PCF receiving a packet addressed to the mobile terminal from PDSN during the wireless link being in the freed status, PCF searches which AP the mobile terminal is connected to, and re-establishes the wireless link between the mobile terminal and the AP by use of the paging function whereby the paging notice including a request for startup of a specified mobile terminal is transmitted via the AP as retrieved, subsequently transferring the packet to the mobile terminal. For this reason, in the case of the mobile terminal being in the idle mode status, the mobile terminal can be activated by execution of the dead peer detection control.

On the other hand, with the access gateway device (PDIF) in the wireless LAN system representative of wireless systems not having the paging function, the paging function for transmitting a notice on arrival of an incoming call to a mobile terminal is not pre-defined. Further, with PDIF, a possibility that the mobile terminal will be in the idle mode status is not assumed. Furthermore, BBR of the wireless LAN system does not manage the connection status between the mobile terminal and the wireless link, and does not have a function for notifying PDIF of the connection status of the wireless link established between the mobile terminal and the AP.

Accordingly, a mobile communications system employing the conventional cellular wireless system in combination with the conventional wireless LAN system has a problem described as follows.

A transmitter and a receiver, utilizing both the wireless systems, are mounted in a mobile terminal. However, there is assumed the case where the mobile terminal will be turned into the idle mode status in order to reduce power consumption, as described with reference to the conventional EVDO system. Particularly, in the case where a constant connection service enabling constant transmission and receiving of a packet is offered to a user, it is assumed that the mobile terminal will undergo transition to the idle mode regardless of wireless system classification. In such a case, with the access gateway device (PDIF) installed in the wireless LAN system, it is not possible to detect the idle mode status, and the out-of-service mode status of the mobile terminal, as previously described. Furthermore, since the mobile terminal cannot be activated by use of the paging function, there will be an increase in frequency at which a session is cut off in the case of connection on the part of the wireless LAN system. In consequence, delay will occur to connection for the next time, and thereafter, so that there arises a problem in that it is not possible to implement the dead peer detection control, and session cutoff just as in the case of the EVDO system.

As a representative example of embodiments of the invention, there is provided a method for dead peer detection of a mobile terminal, to be executed in a mobile communications system including a mobile terminal connected to plural wireless systems, a first connection device terminating a first wireless system with access points managing a connection status between the mobile terminal and a wireless link, and a second connection device terminating a second wireless system with access points not managing a connection status between the mobile terminal and a wireless link, said method comprising the steps of the second connection device acquiring the connection status of the mobile terminal in the first wireless system from the first connection device, and the second connection device changing a dead peer detection control process on the basis of the connection status of the mobile terminal, as acquired.

According to one aspect of the invention, described as above, it becomes possible to construct the mobile communications having plural wireless systems, in which paging can be implemented with the use of a wireless system not having the paging function. Accordingly, it is possible to turn the mobile terminal into the idle mode status whichever wireless system the mobile terminal is connected to, thereby reducing power consumption.

Further, the access gateway device is cable of checking the connection status of a mobile terminal of another wireless system, so that it is possible to eliminate wireless resources, and wasteful session management resources by properly executing the dead peer detection control to thereby limit use of the dead peer detection packet.

Furthermore, since a connection destination of the mobile terminal available for use in the plurality of wireless systems, and the status of the mobile terminal can be managed in a centralized manner, an administrator can easily grasp the status of the mobile terminal.

BRIEF DESCRIPTION OF THE DRAWINGS

FIG. 2 is a block diagram of PDSN of an EVDO system according to the first embodiment of the invention;

FIG. 3 is a view of a session management table held by PDSN according to the first embodiment of the invention;

FIG. 23 is a view showing a sequence of steps of a procedure for dead peer detection in a conventional wireless LAN system.

DETAILED DESCRIPTION OF THE PREFERRED EMBODIMENTS

First Embodiment

A first embodiment of the invention is described hereinafter with reference to the accompanying drawings.

Figure 1:
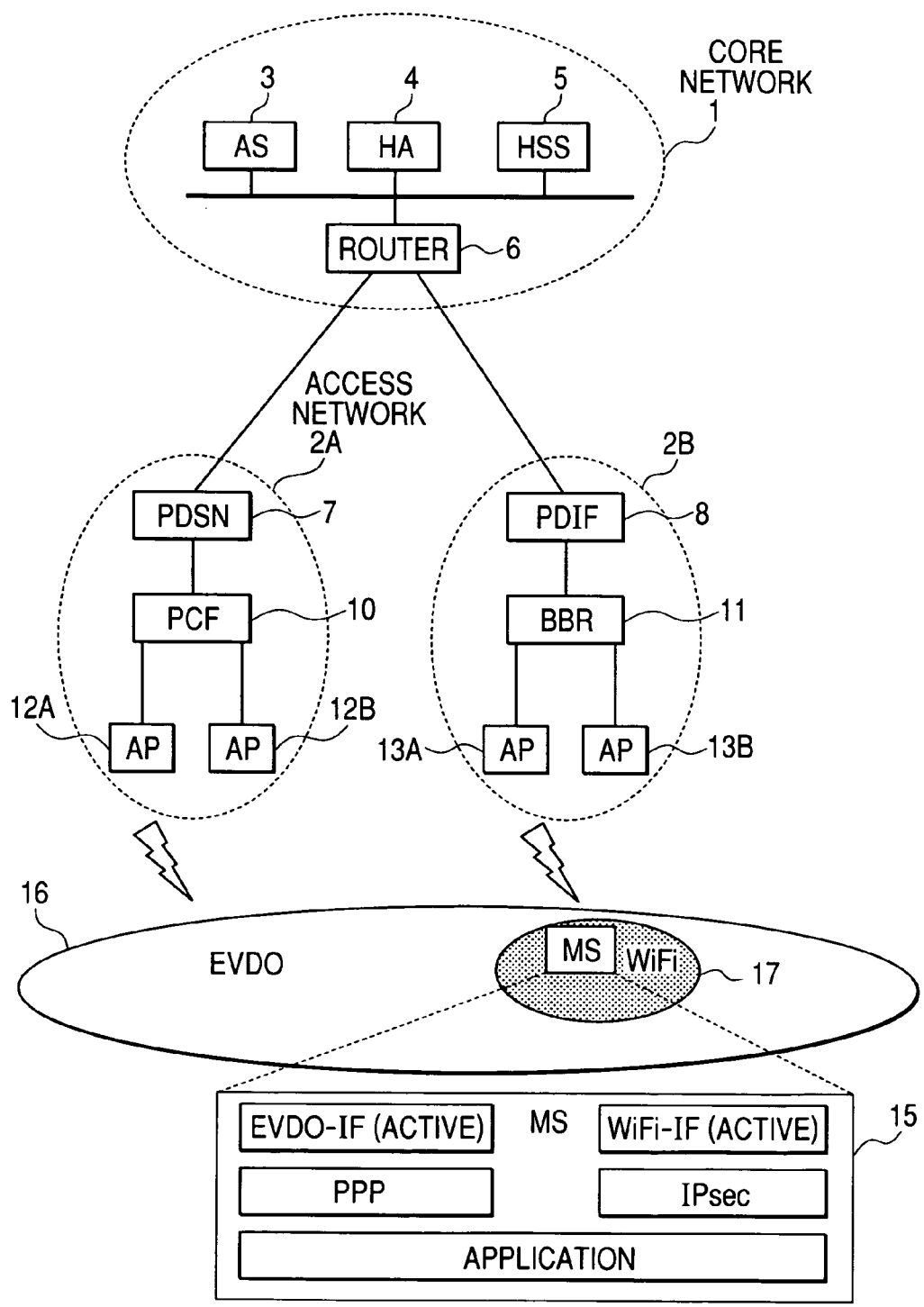
FIG. 1 is a block diagram of a mobile communications system according to a first embodiment of the invention.

FIG. 1 is a block diagram of a mobile communications system according to the first embodiment of the invention.

The mobile communications system has a core network 1, access networks 2 (2A, 2B), and MS 15.

The core network 1 includes AS (Application Server) 3, HA (Home Agent) 4, HSS (Home Subscriber Server) 5, and a router 6.

AS 3 is an application server for providing a user with various kinds of services. HA 4 manages movement of MS 15, transferring a packet addressed to MS 15, received by proxy, to a movement destination of MS 15. HSS 5 is a home subscriber server for storing subscriber information, and identification information on a mobile terminal, assigned thereto, in a database. The router 6 is a router for connecting the core network 1 to the access networks 2A, 2B, respectively.

The access network 2A is an EVDO system of a cellular wireless system, comprising PDSN 7, PCF 10, and APs 12 (12A, 12B).

PDSN 7 manages a session with MS 15 by use of PPP (Point-to-Point Protocol), and a wireless link status of MS 15 is exchanged between PDSN 7 and PCF. PCF 10 is a controller of a base station for relaying data transmitted and received between PDSN 7, and the plural access points. APs 12 each are a wireless repeater of the base station connected to MS 15.

The access network 2B is a WiFi system of a wireless LAN system. Further, the access network 2B includes PDIF 8, BBR 11, and APs 13 (13A, 13B).

PDIF 8 manages a session with MS 15 by use of IPsec SA. BBR (Broad Band Router) 11 is a broadband router for relaying data transmitted and received between PDIF 8 and the plural access points. APs 13 each are a repeater connected to MS 15.

MS 15 has functions for providing services such as an interface through which transmission/receipt of data is executed against the EVDO system, and the WiFi system, respectively, PPP for managing a session with PDSN 7, IPsec for managing a session with PDIF 8, applications, and so forth.

Further, in FIG. 1, there are shown an area 16 accessible by EVDO, and an area 17 accessible by WiFi.

FIG. 2 is a block diagram showing a configuration of PDSN 7 of the EVDO system according to the first embodiment of the invention.

PDSN 7 includes a ROM 70, a CPU 71, a RAM 72, a Switch 74, and IP Interfaces 75 (75A, 75B). Further, respective constituents are connected with each other via a bus 73.

The ROM 70 stores information including a program to be executed by PDSN 7, a setting file for deciding actions of PDSN 7, and so forth. The ROM 70 may be a hard disk installed in another device connected over the network. The CPU 71 executes a program stored in the ROM 70, or the RAM 72. The RAM 72 temporarily stores the program to be executed. Further, the RAM 72 holds a session management table 100, and a dead peer detection control table 300 (not shown in the figure). The Switch 74 is connected to the IP Interfaces 75 to switch between the Interfaces. Each of the IP Interfaces 75 is an interface for executing transmission/receipt of IP packets. Further, plural the IP Interfaces 75 may be provided as long as at least one or more thereof is provided although two units of the IP Interfaces 75 are shown in the figure.

FIG. 3 shows the session management table 100 held by PDSN 7 according to the first embodiment of the invention.

The session management table 100 contains MS management identifier 101, PPP session ID 102, terminal IP address 103, Life Time 104, and terminal status 105.

The MS management identifier 101 is an identifier for a mobile terminal assigned to the MS 15. The PPP session ID 102 is an ID for a session established with the MS 15. The terminal IP address 103 is an IP address for use when the MS 15 is connected to the EVDO system. The Life Time 104 is a time period during which the session managed by PPP is effective. The terminal status 105 is a connection status of the MS 15. Further, active and an idle mode are set to the terminal status. "the terminal status is active" means a status in which the mobile terminal is connected to a base station, and data is being transmitted and received therebetween (the active status). Further, "the terminal status is in the idle mode" means a status in which a wireless link is freed between the MS 15, and PCF 10, but the session between PDSN 7 and the MS 15, using PPP, is not cut off.

Figures 4, 5:
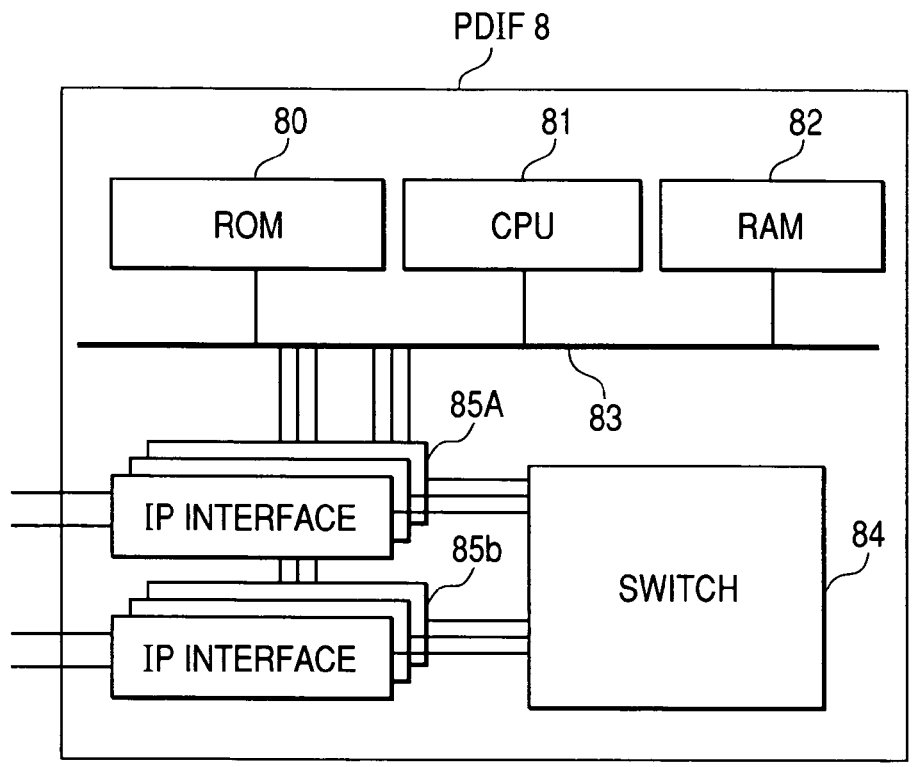
FIG. 4 is a block diagram of PDIF of a WiFi system according to the first embodiment of the invention.
FIG. 5 is a view of a session management table held by PDIF according to the first embodiment of the invention.

FIG. 4 is a block diagram of PDIF 8 of the WiFi system according to the first embodiment of the invention.

PDIF 8 includes a ROM 80, a CPU 81, a RAM 82, a Switch 84, and IP Interfaces 85 (85A, 85B). Further, respective constituents are connected with each other via a bus 83.

The ROM 80 stores information including a program to be executed by PDIF 8, a setting file for deciding actions of PDIF 8, and so forth. The ROM 80 may be a hard disk installed in another device connected over a network. The CPU 81 executes a program stored in the ROM 80, or the RAM 82. The RAM 82 temporarily stores the program to be executed. Further, the RAM 82 contains a session management table 200, and the dead peer detection control table 300 (not shown in the figure). The Switch 84 is connected to the IP Interfaces 85 to switch between the Interfaces. Each of the IP interfaces 85 is an interface for executing transmission/receipt of IP packets. Further, plural the IP Interfaces 85 may be provided as long as at least one or more thereof is provided although two units of the IP Interfaces 85 are shown in the figure.

FIG. 5 shows the session management table 200 held by PDIF 8 according to the first embodiment of the invention.

The session management table 200 contains MS management identifier 201, IPsec SA ID 202, terminal IP address 203, Life Time 204, and terminal status 205.

The MS management identifier 201 is an identifier for a mobile terminal assigned to MS 15. The IPsec SA ID 202 is an ID for a session established with the MS 15. The terminal IP address 203 is an IP address for use when MS 15 is connected to the WiFi system. The Life Time 204 is a time period during which a session managed by IPsec SA is effective. The terminal status 205 is a connection status of the MS 15. With PDIF 8, a wireless link status of the MS 15 cannot be detected, so that the terminal status 205 is always set to "active" upon entry. "upon entry" means a status in which a session is established between the MS 15, and PDIF 8.

Next, there is described hereinafter the setting content of a dead peer detection control system as read from the ROM 80 when PDSN 7 and PDIF 8 are activated with reference to FIG. 6. In this connection, the dead peer detection control system is set by an administrator.

Figure 6:
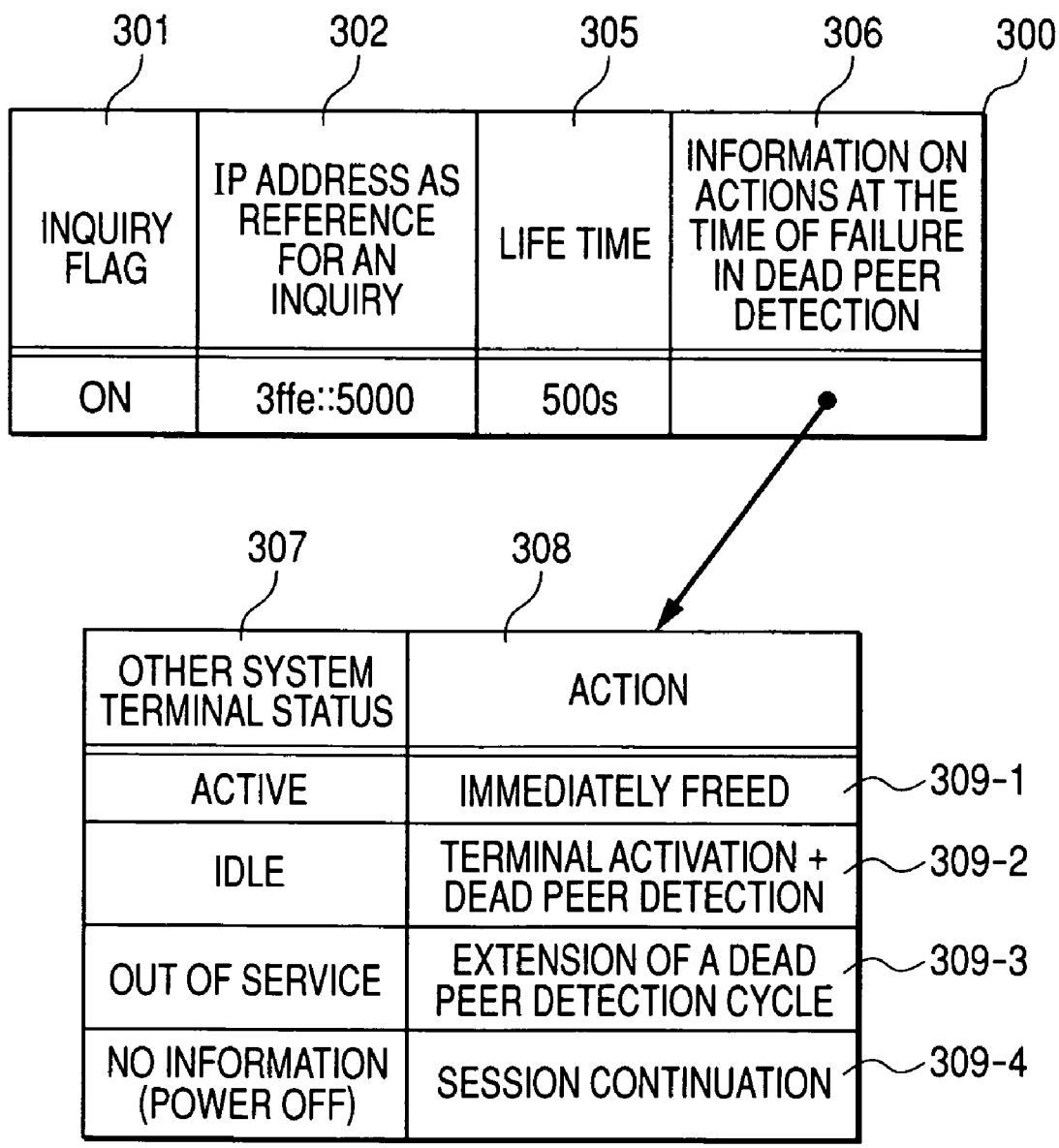
FIG. 6 is a view of a dead peer detection control table according to the first embodiment of the invention.

FIG. 6 shows the dead peer detection control table 300 according to the first embodiment of the invention.

The dead peer detection control table 300 contains inquiry flag 301, IP address 302 as reference for an inquiry, Life Time 305, and information 306 on actions at the time of failure in the dead peer detection.

The inquiry flag 301 is a flag for showing whether or not a connection status of a mobile terminal connected to an external device of the relevant wireless system is to be checked against an external device of another wireless system in case of failure in the dead peer detection. The external device of another wireless system refers to, for example, PDSN 7 opposite to PDIF 8 according to the first embodiment of the invention.

The IP address 302 as the reference for an inquiry is the IP address of the external device to be inquired about if the inquiry flag 301 is "ON". Further, as to the IP address, plural IP addresses of external devices that can be inquired about may be set.

The Life Time 305 is a time interval at which PDSN 7 or PDIF 8 executes the dead peer detection.

The information 306 on the actions at the time of failure in the dead peer detection is information on the actions executed when the connection status of a mobile terminal is acquired from other external devices. Further, the information 306 on the actions at the time of failure in the dead peer detection contains other system terminal status 307, and Action 308.

The other system terminal status 307 indicates a connection status of the mobile terminal of another wireless system, as acquired. More specifically, "Active," "idle," "out of service," and "no information (power OFF)" are set therein. "Active" means that the mobile terminal is in the active status. Further, "idle" means that the mobile terminal is in an idle mode status. Further, "out-of-service" means that the mobile terminal is in an out-of-service status. Then, "no information (power OFF)" means that the power supply of the mobile terminal is in the OFF status.

Action 308 indicates the content of the action executed by PDSN 7 or PDIF 8 according to the status as set in the other system terminal status 307. For example, in the case of "immediately freed", a wireless link is immediately freed. Further, in the case of "terminal activation+dead peer detection", the mobile terminal is activated into the active status, and subsequently, the dead peer detection control is executed again. Further, in the case of "extension of a dead peer detection cycle", time set in the Life Time 305 is changed to thereby extend a cycle in which the dead peer detection control is executed. In the case of "session continuation", a session with the mobile terminal is maintained.

Next, referring to FIG. 7, there is described hereinafter dead peer detection control executed in the first embodiment of the invention.

Figure 7:
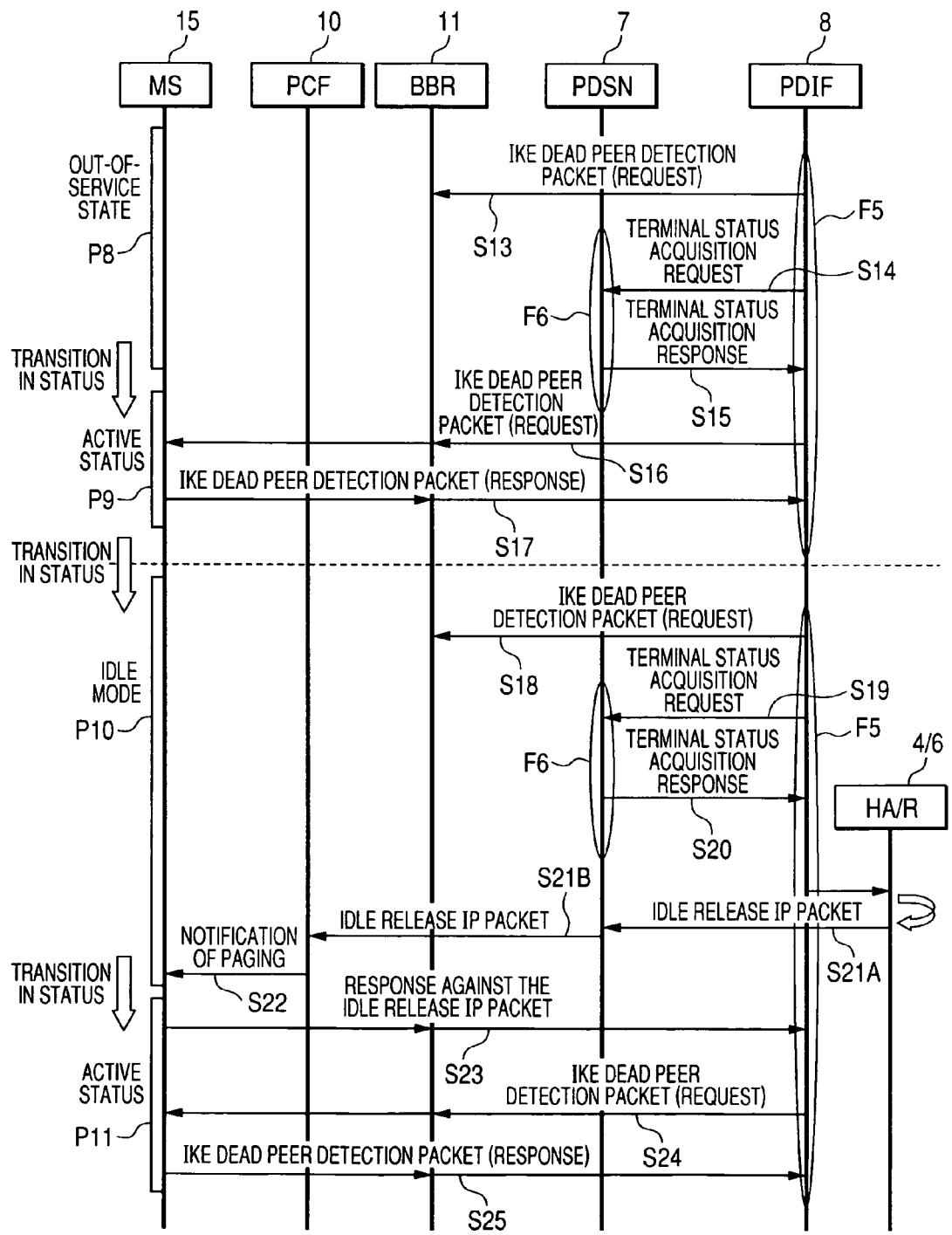
FIG. 7 is a view showing a sequence of steps for executing the dead peer detection control according to the first embodiment of the invention.

FIG. 7 is a view showing a sequence of steps for executing the dead peer detection control according to the first embodiment of the invention.

With the first embodiment of the invention, there is described hereinafter the dead peer detection executed at PDIF 8 of the wireless LAN system.

Figure 8:
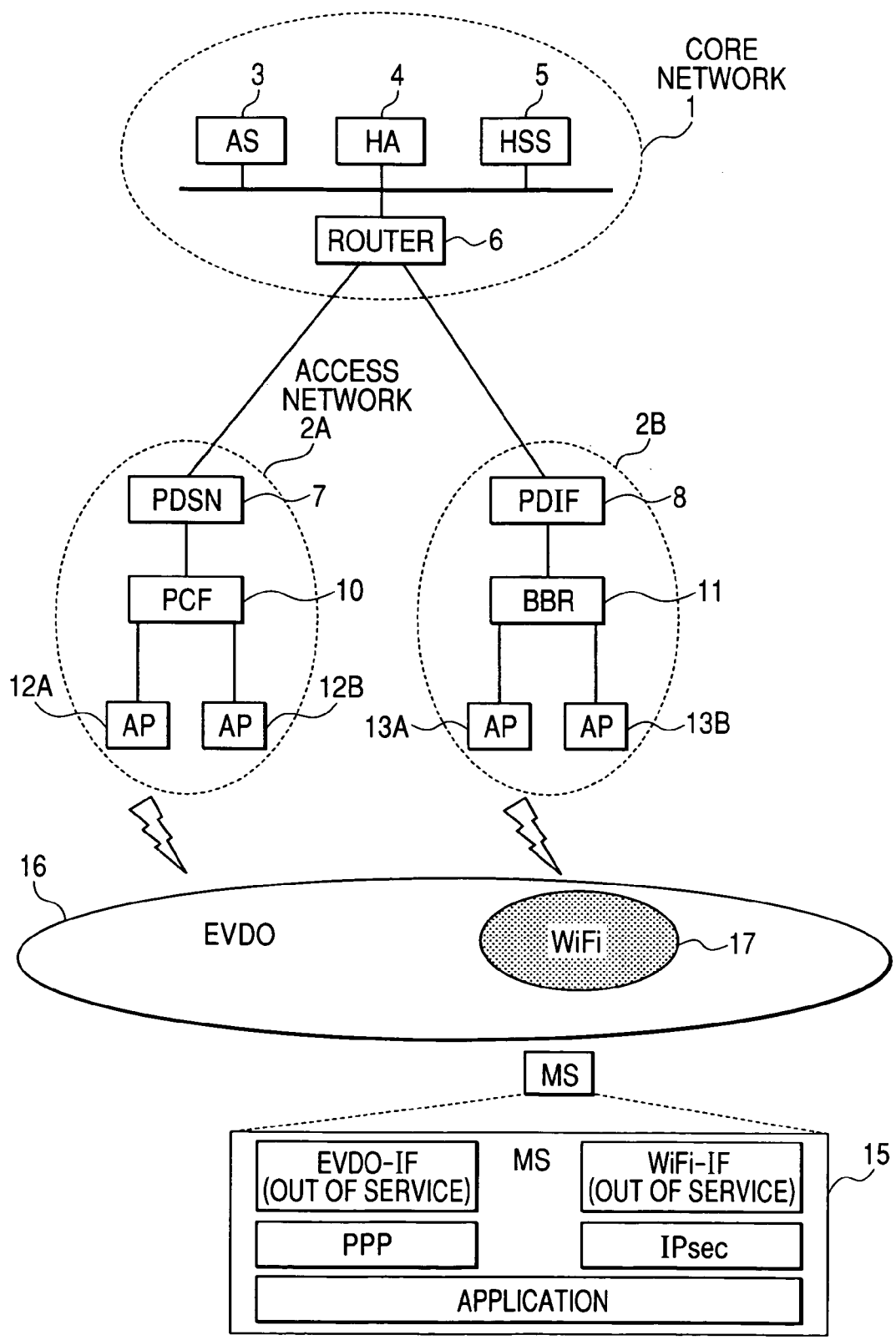
FIG. 8 is a block diagram of the mobile communications system according to the first embodiment of the invention in the case where MS 15 is in an out-of-service status in both the EVDO system, and the WiFi system.

First, there is described the dead peer detection in the case where both an interface between MS 15, and the EVDO system, and an interface between MS 15, and the WiFi system are in the out-of-service status, as shown in FIG. 8.

First, PDIF 8 transmits a dead peer detection packet using IKE to the MS 15 connected thereto (step S13). Because the MS 15 is in the out-of-service status in this case, the dead peer detection packet does not reach the MS 15, so that the dead peer detection by use of the dead peer detection packet ends up in failure.

Next, in the case of no response to the dead peer detection packet from the MS 15, PDIF 8 refers to the IP address 302 as the reference for an inquiry in the dead peer detection control table 300, and transmits a terminal status acquisition request to PDSN 7 indicated by the IP address as set (step S14). PDSN 7 refers to the session management table 200, thereby acquiring the terminal status of the MS 15 having received the request from PDIF 8 (F6). Then, PDSN 7 transmits the terminal status as acquired to PDIF 8 (step S15).

Subsequently, PDIF 8 refers to the dead peer detection control table 300 on the basis of the terminal status as received, thereby determining an action on the basis of the terminal status. For example, since the status of the MS 15 at PDSN 7 is "out of service", PDIF 8 refers to the Action 308 of the dead peer detection control table 300, thereby extending the dead peer detection cycle.

Then, after completion of an extended cycle, PDIF 8 transmits the dead peer detection packet to the MS 15 again (step S16). In the case of the MS 15 having made transition to the active status, the MS 15 transmits a response packet against the dead peer detection packet as received to PDIF 8 (step S17).

Figure 9:
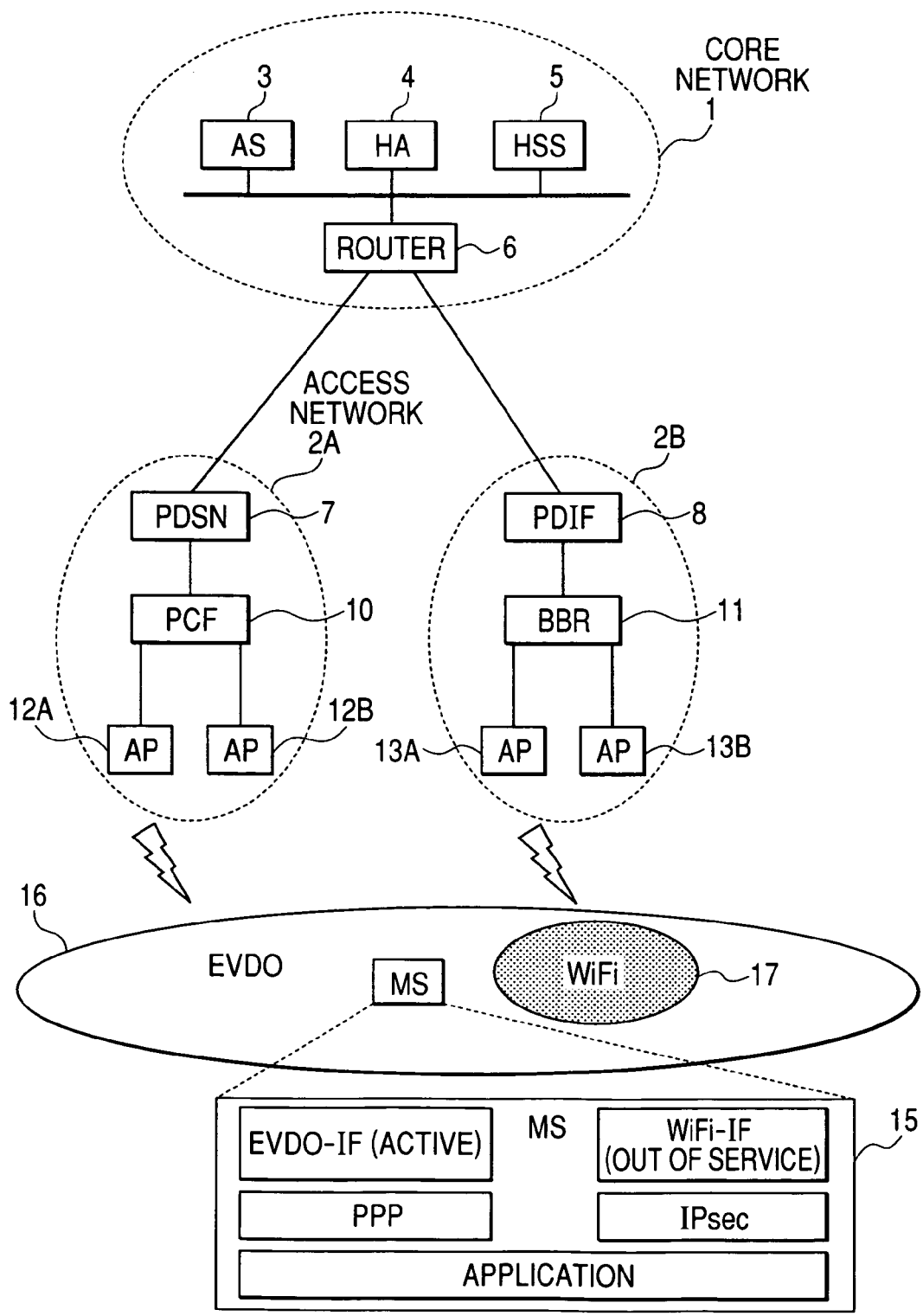
FIG. 9 is a block diagram of the mobile communications system according to the first embodiment of the invention in the case where MS 15 is in an active status in the EVDO system while MS 15 is in the out-of-service status in the WiFi system.

Next, there is described the dead peer detection in the case where the EVDO system is in the active status while the WiFi system is in the out-of-service status, as shown in FIG. 9.

If PDSN 8 is in the active status, and PDIF 7 is in the out-of-service status, processing in the steps S13 to S15, shown in FIG. 7, are similarly executed. However, since the EVDO system is in the active status, if PDIF 8 similarly refers to the dead peer detection control table 300, the table is set such that "immediately freed" is to apply. Accordingly, PDIF 8 cuts off a session with the MS 15 even if there is no response to the dead peer detection packet received from the MS 15.

Figure 10:
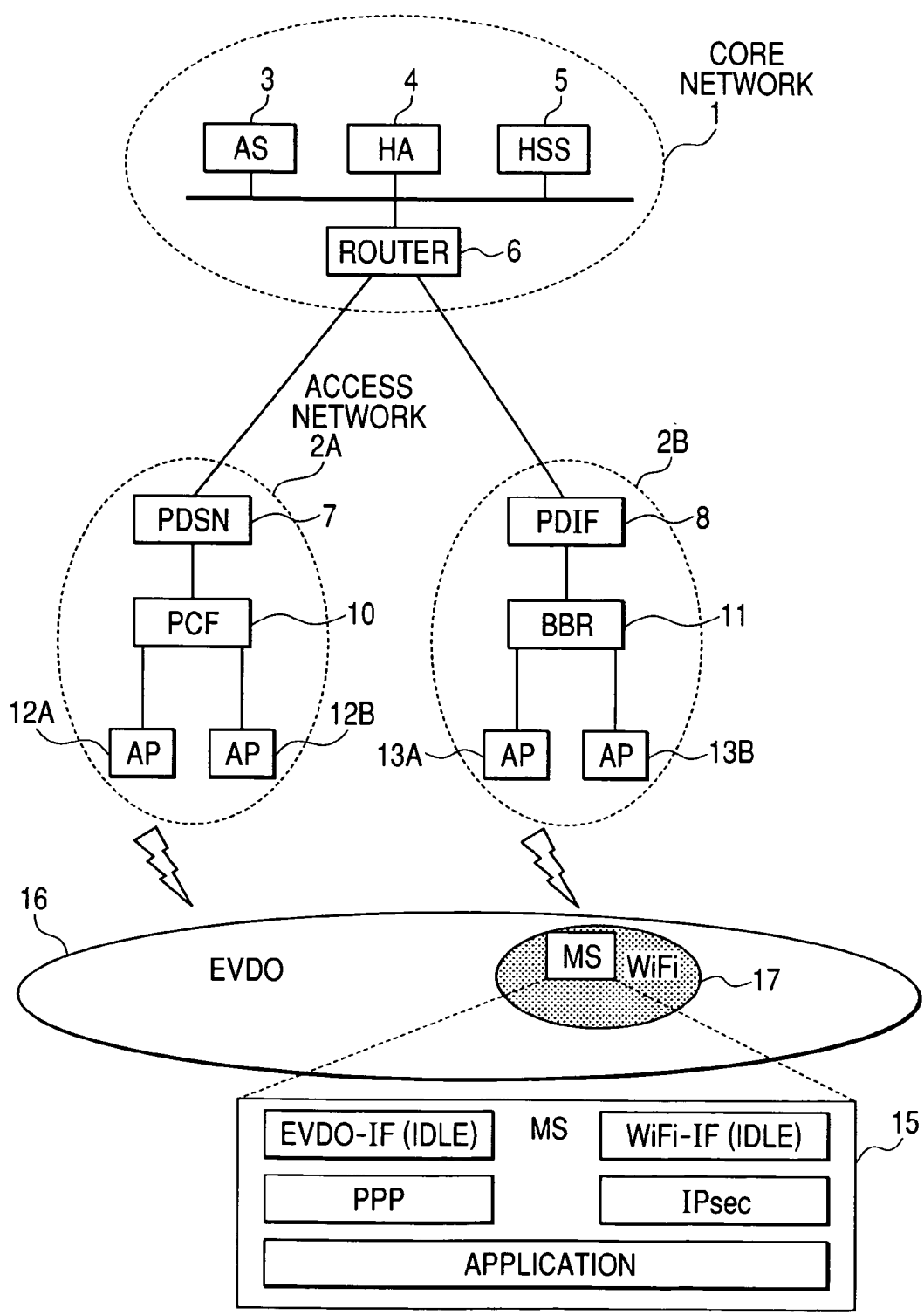
FIG. 10 is a block diagram of the mobile communications system according to the first embodiment of the invention in the case where both the interface between MS 15, and the EVDO system, and the interface between MS 15, and the WiFi system are in an idle mode status.

Next, there is described the dead peer detection in the case where both the interface between the MS 15 and EVDO system, and the interface of the MS 15 between the WiFi system are in the idle mode status, as shown in FIG. 10.

If the MS 15 is in the idle mode status, as shown in FIG. 7, PDIF 8 first transmits the dead peer detection packet using IKE to the MS 15 (step S18). In this case, the dead peer detection packet does not reach the MS 15 as in the case of the out-of-service status, so that the dead peer detection ends up in failure.

Next, in the case of no response to the dead peer detection packet being received from the MS 15, PDIF 8 refers to the IP address 302 as the reference for an inquiry in the dead peer detection control table 300, and transmits the terminal status acquisition request to PDSN 7 indicated by the IP address as set (step S19). PDSN 7 refers to the session management table 200, thereby acquiring the terminal status of the MS 15 having received the request from PDIF 8 (F6). Then, PDSN 7 transmits the terminal status as acquired to PDIF 8 (step S20).

Subsequently, PDIF 8 refers to the dead peer detection control table 300 on the basis of the terminal status as received, thereby determining an action on the basis of the terminal status. For example, since the status of the MS 15 at PDSN 7 is in the idle mode, PDIF 8 refers to Action 308 of the dead peer detection control table 300, and activates the MS 15 into the active status, thereby executing the dead peer detection again.

Then, when PDIF 8 receives the terminal status of the MS 15 from PDSN 7 in the step S20, PDIF 8 acquires an IP address that MS 15 makes use of over PDSN 7. The IP address acquired is set to a destination address, and PDIF 8 transmits a save-power release IP packet containing an IP address of PDIF 8 itself as a source address to PDSN 7 via the router 6, and HA 4 (step S21A). PDSN 7 transfers the idle release IP packet as received to PCF 10 (step S21B).

PCF 10, upon receiving the idle release IP packet, transmits paging to the MS 15 (step S22). The MS 15, after receipt of the paging, activates the interface thereof, opposite to the wireless LAN system. Then, the MS 15 having made transition from the idle mode status to the active status transmits a response packet to PDIF 8 (step S23).

Subsequently, PDIF 8 transmits the dead peer detection packet using IKE to the MS 15 again (step S24). Since the MS 15 have made transition to the active status, the MS 15 transmits a response packet to PDIF 8 (step S25).

Herein, there is described hereinafter a method for activating the mobile terminal in the idle mode status so as to be turned into the active status in the wireless LAN system not having the paging function.

As a method for activating a mobile terminal, there is available a method adopting the conventional technology. More specifically, it is a method whereby another system having the paging function transmits a packet for notifying paging, including interface information on a mobile terminal to be activated. With the method according to the first embodiment of the invention, however, PDSN 7 does not contain particular information in a packet for notifying the paging, but implements the paging function by transferring an ordinary IP packet.

As described in the foregoing, since the dead peer detection can be executed after PDIF 8 has activated the MS 15, it is possible to avoid wasteful freeing of the session.

Now, referring to FIG. 11, there is described hereinafter processing for changing the dead peer detection control without immediately freeing the session in accordance to the actions at the time of failure in the dead peer detection, as set by the administrator, in the case of failure in the dead peer detection.

Figure 11:
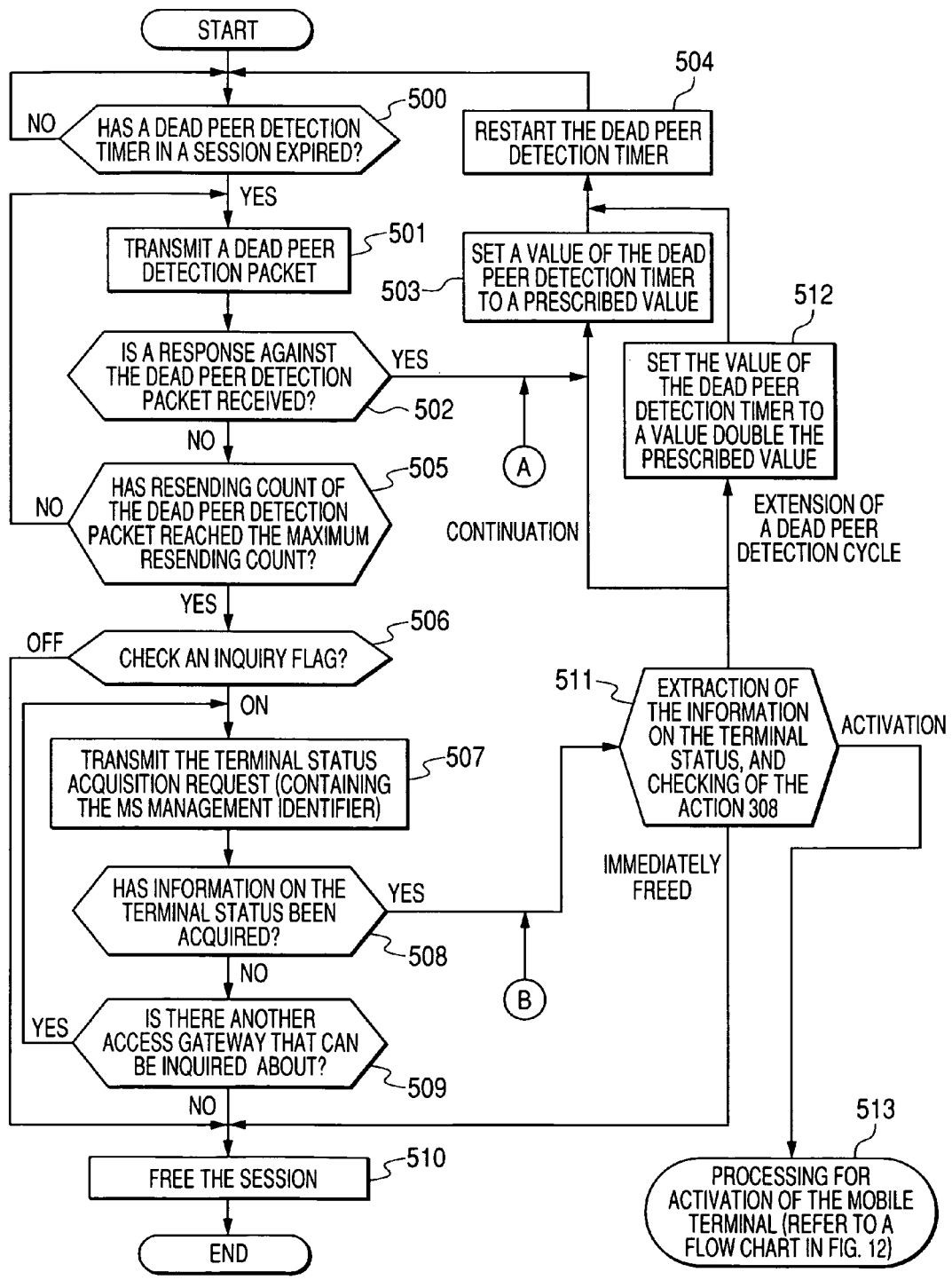
FIG. 11 is a flow chart of processing for changing dead peer detection control according to the first embodiment of the invention.

FIG. 11 is a flow chart of the processing for changing the dead peer detection control according to the first embodiment of the invention.

The processing for changing the dead peer detection control is processing to be executed while the dead peer detection control is being carried out.

First, PDIF 8 refers to the Life Time 204 of the session management table 200 to thereby determine whether or not a dead peer detection timer set in the session indicates the elapse of time of the Life Time 204 (step 500). If the dead peer detection timer indicates the elapse of the time set in the Life Time 204, the processing proceeds to the next step. On the other hand, if the dead peer detection timer does not indicate the elapse of the time set in the Life Time 204, PDIF 8 checks a dead peer detection timer in the next session.

Next, PDIF 8 transmits a dead peer detection packet to the MS 15 (step 501). Then, PDIF 8 determines whether or not a response to the dead peer detection packet is received from the MS 15 (step 502). If the response is received from the MS 15, the processing proceeds to step 503. On the other hand, if the response cannot be received from the MS 15, the processing proceeds to step 505.

Next, PDIF 8 sets a value of the dead peer detection timer to a value of the Life Time 204, set in the session management table 200 (the step 503). Subsequently, PDIF 8 restarts the dead peer detection timer, thereby checking the dead peer detection timer in the next session (step 504).

Next, PDIF 8, after transmission of the dead peer detection packet, determines whether or not resending count of the dead peer detection packet has reached the maximum resending count number (step 505). If not, the processing reverts to the step 501, thereby transmitting the dead peer detection packet again. On the other hand, if the resending count of the dead peer detection packet has reached the maximum resending count number, the processing proceeds to step 506.

Subsequently, PDIF 8 determines that the processing for the dead peer detection control has failed, thereby checking the inquiry flag 301 of the dead peer detection control table 300 (the step 506). If the inquiry flag is set OFF, the processing proceeds to step 510, and PDIF 8 frees the session with the MS 15 (the step 510), thereby completing the processing. On the other hand, if the inquiry flag is set ON, the processing proceeds to step 507.

Next, PDIF 8 extracts the IP address 302 as the reference for an inquiry of the dead peer detection control table 300, and the MS management identifier 201 of the session management table 200 out of the dead peer detection control table 300, and the session management table 200, respectively. Then, PDIF 8 transmits the terminal status acquisition request containing the MS management identifier 201 to an access gateway (for example, PDSN 7) indicated by the IP address 302 as the reference for an inquiry (the step 507).

Subsequently, PDIF 8 determines whether or not information on the terminal status has been acquired on the basis of a response from PDSN 7 (step 508). If yes, the processing proceeds to step 511. On the other hand, if the terminal status acquisition request has not been acquired, the processing proceeds to step 509.

Then, PDIF 8 checks whether or not another access gateway that can be inquired about is registered in the dead peer detection control table 300 (the step 509). If yes, PDIF 8 transmits the terminal status acquisition request to an access gateway (for example, PDSN 7) indicated by an IP address as the reference for another inquiry in the step 507. On the other hand, if another access gateway that can be inquired about is not registered, the processing proceeds to the step 510, whereupon PDIF 8 frees the session, thereby completing the processing.

In the step 511, PDIF 8 checks the Action 308 corresponding to the other system terminal status 307 of the dead peer detection control table 300 on the basis of the information on the terminal status, acquired from PDSN 7. In the case where the terminal status set in the Action 308 is "immediately freed", the processing proceeds to the step 510, and PDIF 8 frees the session with the MS 15, thereby completing the processing. Further, by setting the Life Time 204, PDIF 8 maintains the session as established. In the case where the Action 308 indicates "session continuation", the processing proceeds to the step 503, whereupon PDIF 8 sets the value of the dead peer detection timer to the value of the Life Time 204, set in the session management table 200. In the case where the Action 308 indicates "extension of a dead peer detection cycle", the processing proceeds to step 512, whereupon PDIF 8 sets the value of the dead peer detection timer to a value double the value of the Life Time 204, set in the session management table 200. As a result of the value of the dead peer detection timer being set to the value double the value of the Life Time 204, PDIF 8 continues the dead peer detection without cutting off the session. Then, in step 504, PDIF 8 restarts the dead peer detection timer having the value set to double the initial value thereof, thereby checking the dead peer detection timer in the next session. In the case where the Action 308 indicates "terminal activation+dead peer detection", the processing proceeds to step 513, and PDIF 8 executes processing for activation of the mobile terminal. Further, PDIF 8 is able to carry out the dead peer detection again by causing the mobile terminal to undergo transition to the active status. The processing for activation of the mobile terminal will be described in detail with reference to FIG. 12 shown hereunder.

Figure 12:
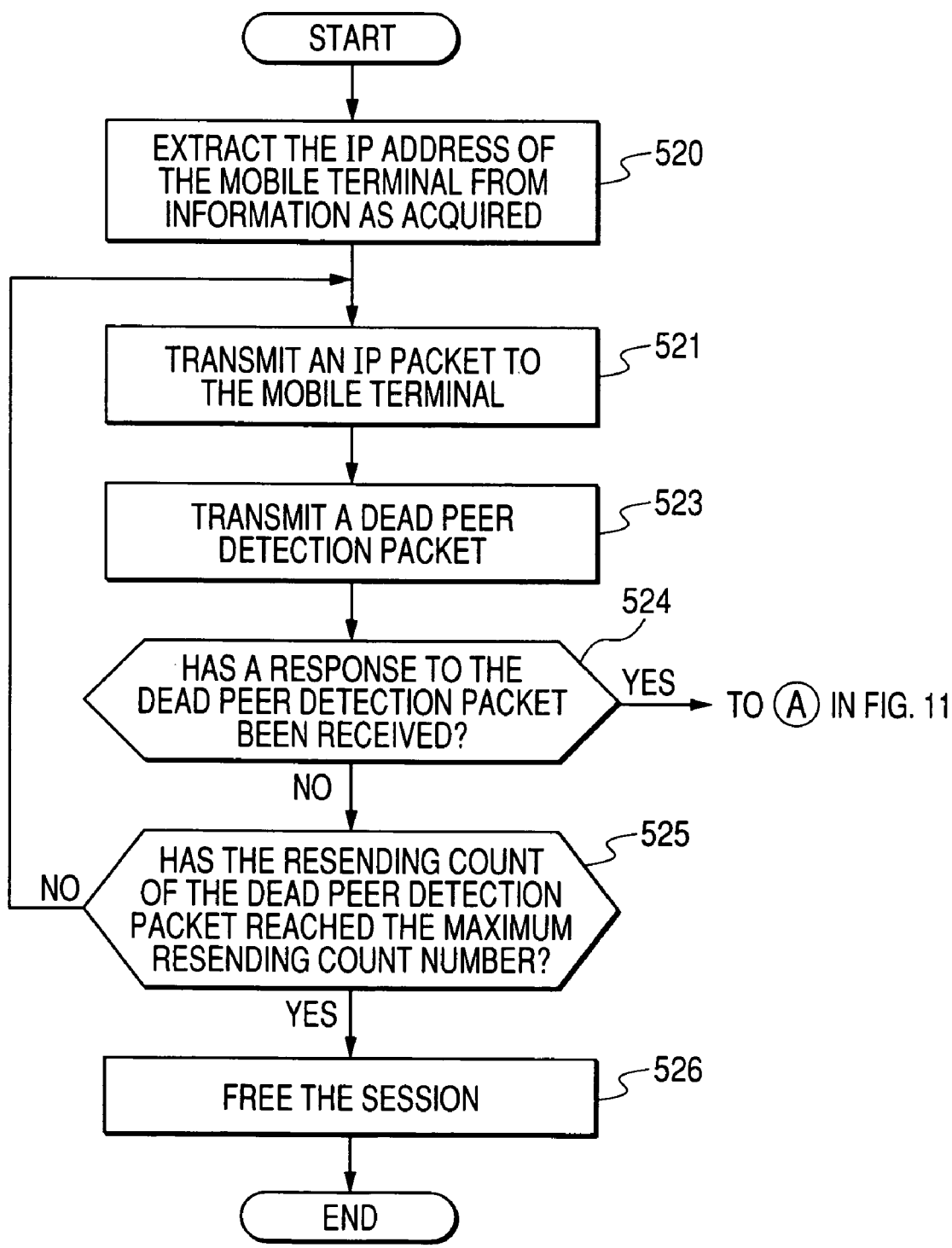
FIG. 12 is a flow chart showing processing for activation of the mobile terminal according to the first embodiment of the invention.

FIG. 12 is a flow chart showing the processing for the activation of the mobile terminal according to the first embodiment of the invention.

First, PDIF 8 extracts the IP address of MS 15 from a response to a terminal status information acquisition request (step 520). Then, PDIF 8 transmits an IP packet in which the IP address of the MS 15, as extracted, is set as a destination address, and the IP address of PDIF 8 itself is set as a source address to the MS 15 (step 521). In this case, since the IP packet is transmitted to the MS 15 via PDSN 7 having the paging function, as described with reference to FIG. 7, if the MS 15 is in the idle mode status, the MS 15 undergoes transition to the active status.

Next, PDIF 8, after transmitting the IP packet, transmits again the dead peer detection packet to the MS 15 (step 523). Then, PDIF 8 determines whether or not a response to the dead peer detection packet has been received from the MS 15

(step 524). If the response to the dead peer detection packet has been received from the MS 15, the processing proceeds to the step 503 in FIG. 11, whereupon PDIF 8 sets the value of the dead peer detection timer to the value of the Life Time 204, set in the session management table 200. On the other hand, if the response to the dead peer detection packet has not been received from the MS 15, the processing proceeds to step 525.

Next, PDIF 8 determines whether or not the resending count of the dead peer detection packet has reached the maximum resending count number (the step 525). If the resending count of the dead peer detection packet has not reached the maximum resending count number, the processing reverts to the step 521, and PDIF 8 transmits the IP packet again to the MS 15 via PDSN 7. On the other hand, if the resending count of the dead peer detection packet has reached the maximum resending count number, the processing proceeds to step 526, where upon PDIF 8 frees the session with the MS 15, thereby completing the processing.

Now, there is described hereinafter processing at the time of PDSN 7 receiving the terminal status acquisition request from PDIF 8 with reference to FIG. 13.

Figure 13:
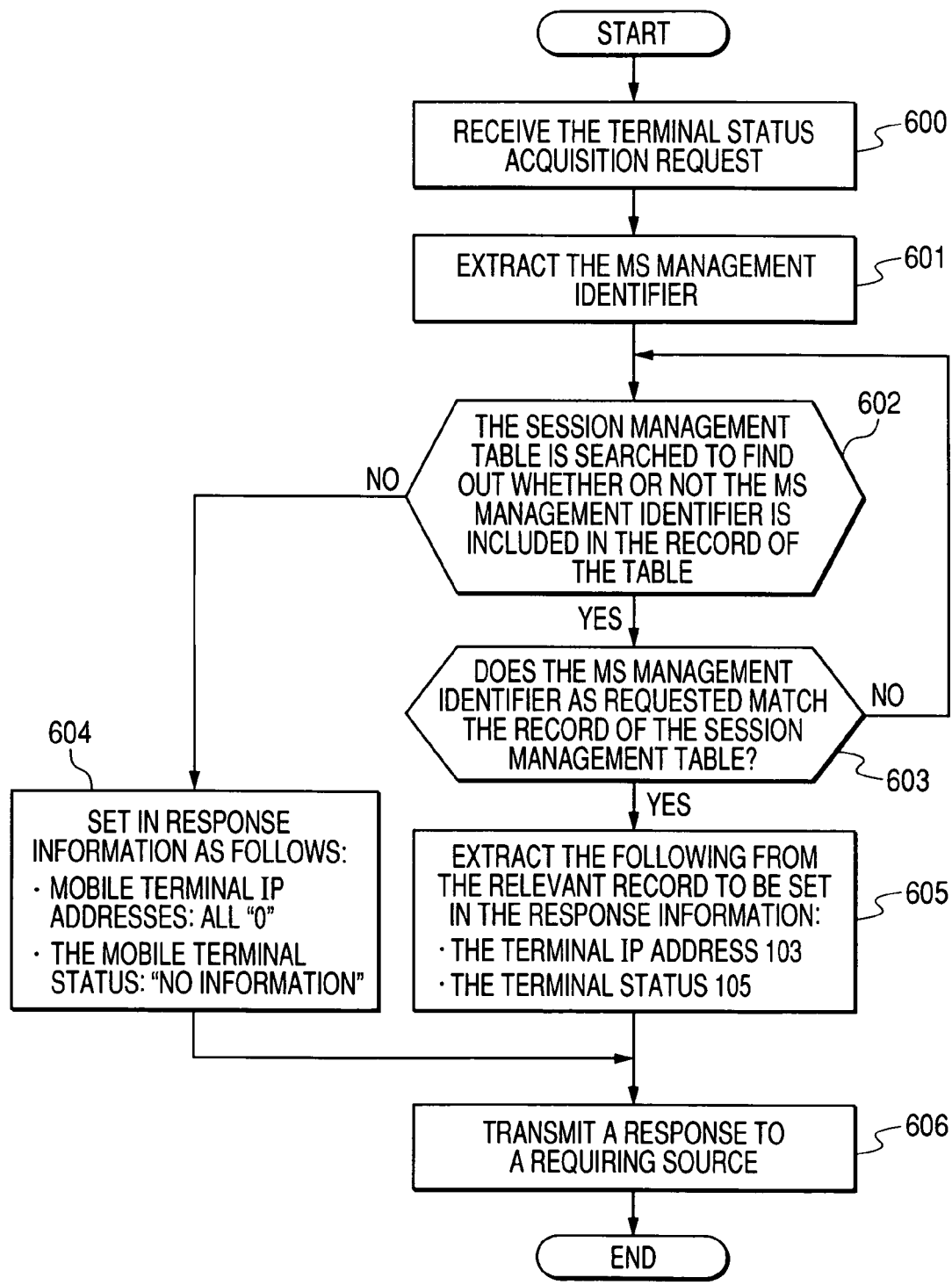
FIG. 13 is a flow chart showing response processing by PDSN according to the first embodiment of the invention.

FIG. 13 is a flow chart showing response processing by PDSN 7 according to the first embodiment of the invention.

First, PDSN 7 receives the terminal status acquisition request from PDIF 8 (step 600). Next, PDSN 7 extracts the terminal management identifier contained in the terminal status acquisition request (step 601).

Then, PDSN 7 refers to the session management table 100, thereby searching to find out whether or not the terminal management identifier as extracted is included in record of the session management table 100 (step 602). If the terminal management identifier as extracted is not included in the record of the session management table 100, PDSN 7 sets information on all mobile terminal IP addresses to "0"S while setting the mobile terminal status as "no information" in response information (step 604), and the processing proceeds to step 606. On the other hand, if the terminal management identifier is included in the record of the session management table 100, PDSN 7 determines whether or not the terminal management identifier as requested by PDIF 8 matches the record of the session management table 100 (step 603). If the terminal management identifier as requested by PDIF 8 does not match the record of the session management table 100, the processing reverts to the step 602, and PDSN 7 searches the next record. On the other hand, if the terminal management identifier as requested matches the record of the session management table 100, the processing proceeds to step 605.

Next, PDSN 7 extracts the terminal IP address 103, and the terminal status 105, stored in the record as matched, and sets extracted information as response information (the step 605).

Subsequently, PDSN 7 transmits the response information as set to PDIF 8, thereby completing the processing (the step 606).

With the first embodiment of the invention, it has been described hereinbefore that in the case of the mobile communications system having the plural wireless systems, the EVDO system is used as the wireless communication system having the paging function, and the WiFi system is used as the wireless system not having the paging function; however, the mobile communications system according to the first embodiment of the invention may be implemented by use wireless systems other than those described.

Second Embodiment

With the first embodiment of the invention, the connection status of the mobile terminal is exchanged between the respective access gateways. Meanwhile, with a second embodiment of the invention, the respective access gateways transmit the connection status of the mobile terminal to a session management server, thereby exchanging the connection status of the mobile terminal between the respective access gateways and the session management server.

More specifically, with the second embodiment of the invention, HSS is used as the session management server. HSS manages not only subscriber information but also the connection status of the mobile terminal. Accordingly, HSS is described as the session management server in the following description.

Figure 14:
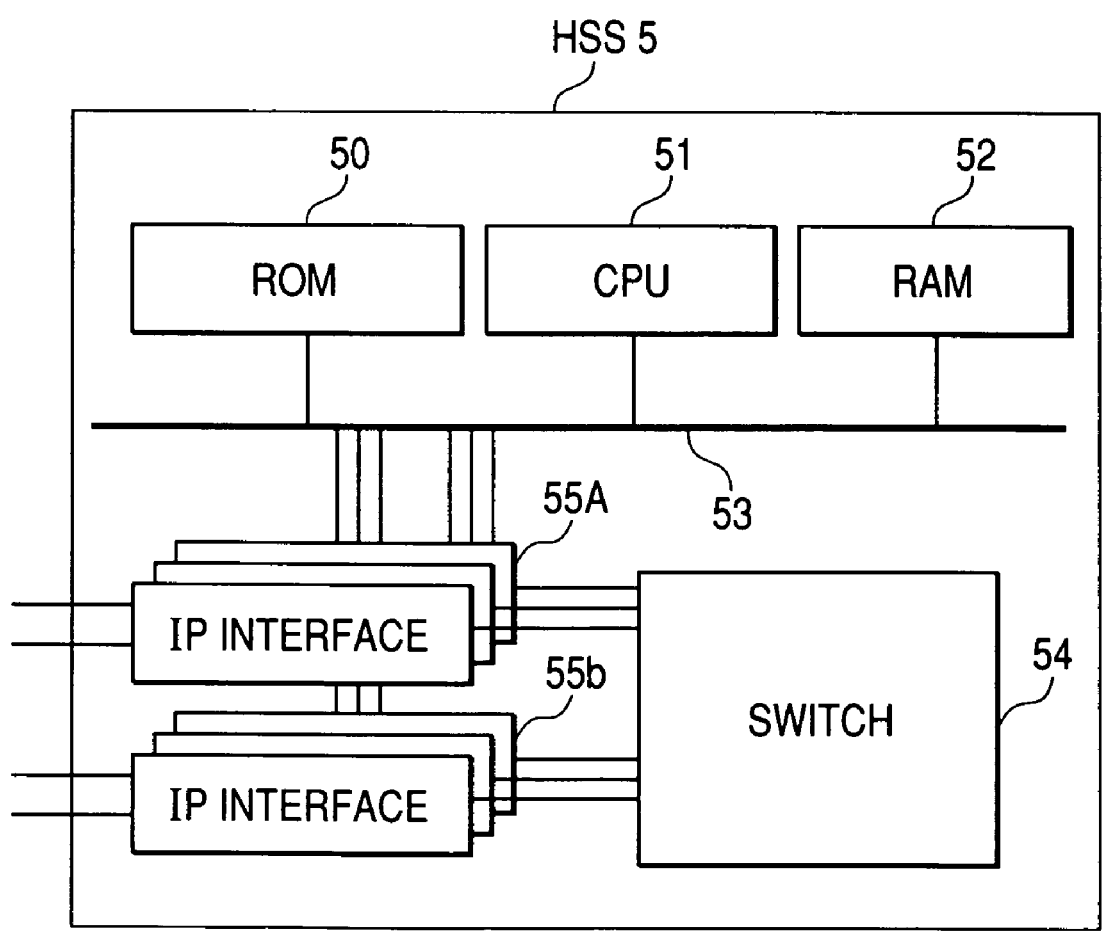
FIG. 14 is a block diagram of HSS according to a second embodiment of the invention.

FIG. 14 is a block diagram of HSS 5 according to the second embodiment of the invention.

HSS 5 includes a ROM 50, a CPU 51, a RAM 52, a Switch 54, and IP Interfaces 55 (55A, 55B). Further, respective constituents are connected with each other via a bus 53.

The ROM 50 stores information including a program to be executed by HSS 5, a management table for deciding actions of HSS 5, and so forth. Further, the ROM 50 may be a hard disk installed in another device connected over a network. The CPU 51 executes a program stored in the ROM 50, or the RAM 52. The RAM 52 temporarily stores the program to be executed. Further, the RAM 52 contains a session management table 400 (not shown in the figure). The Switch 54 is connected to the IP Interfaces 55 to thereby switch between the Interfaces. Each of the IP Interfaces 55 is an interface for executing transmission/receipt of IP packets. Further, plural the IP Interfaces 55 may be provided as long as at least one or more thereof is provided although two units of the IP Interfaces 55 are shown in the figure.

Figure 16:
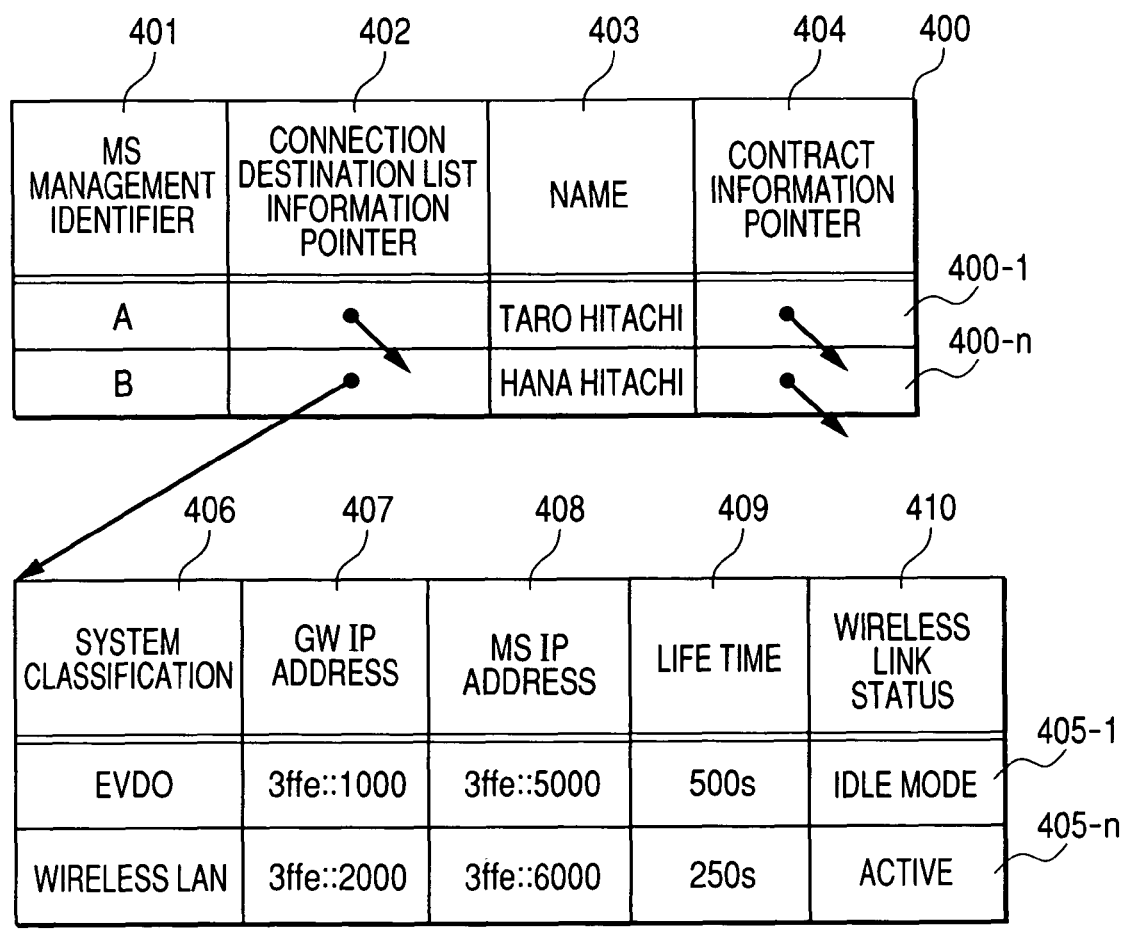
FIG. 16 is a view of a session management table 400 according to the second embodiment of the invention.

FIG. 16 shows a session management table 400 according to the second embodiment of the invention.

The session management table 400 contains terminal management identifier 401, connection destination list information 402, name 403 and contract information 404

The terminal management identifier 401 is an identifier for a mobile terminal assigned to MS 15. The connection destination list information 402 includes system classification 406, GW IP address 407, mobile terminal IP address 408, Life Time 409, and wireless link status 410. The system classification 406 indicates classification of the wireless system to which MS 15 is connected. The GW IP address 407 indicates IP addresses of respective access gateways of the wireless systems. The mobile terminal IP address 408 indicates IP addresses for use when MS 15 is connected to the respective wireless systems. The Life Time 409 is a time period during which a session as established is effective. The wireless link status 410 indicates a connection status of MS 15. The name 403 indicates names of subscribers, each in possession of a mobile terminal. The contract information 404 is information on contracts with the respective subscribers, concerning the mobile terminal.

Thus, since a connection destination of a mobile terminal available for use in plural wireless systems, and the status of the mobile terminal are managed in a centralized manner by HSS 5, an administrator can easily grasp the status of the mobile terminal.

Next, there is described hereinafter a dead peer detection control table 300 held by PDSN 7, and PDIF 8, respectively, in the second embodiment of the invention, with reference to FIG. 15.

Figure 15:
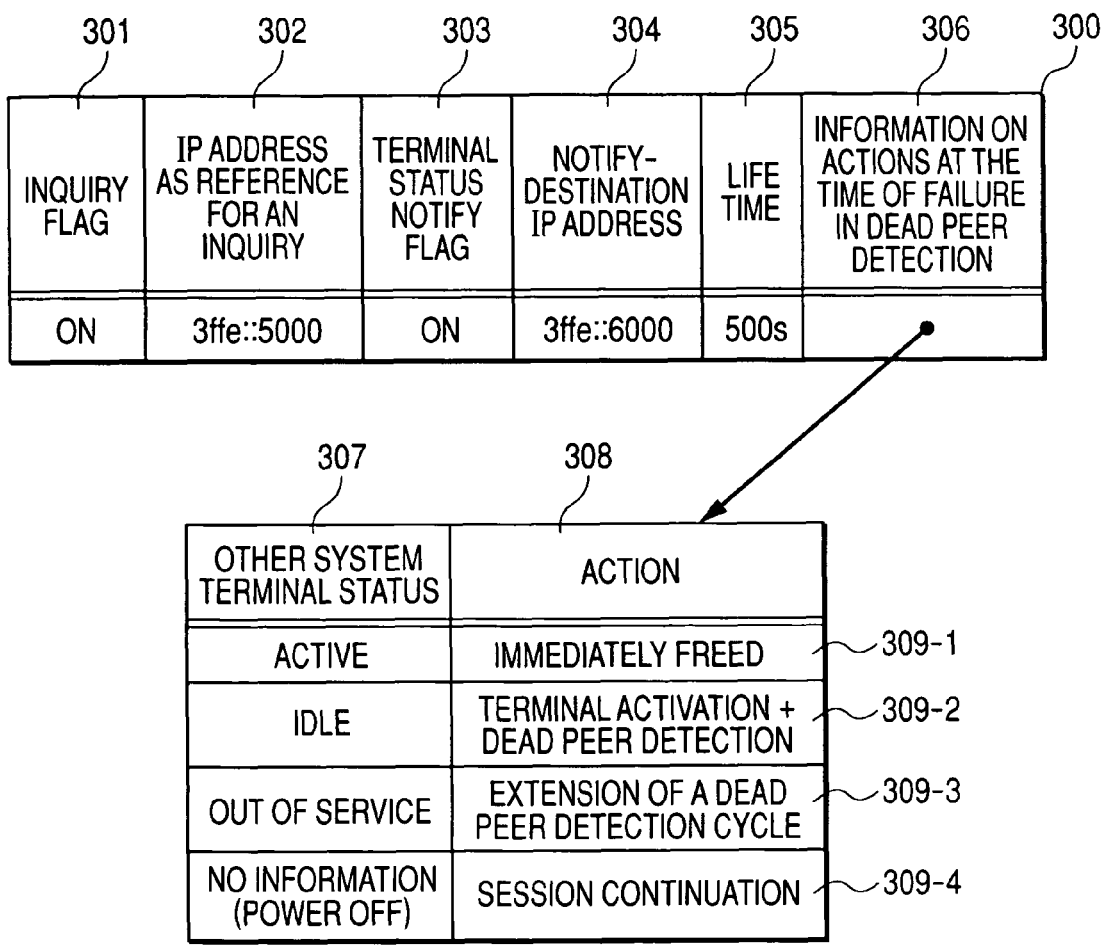
FIG. 15 is a view of a dead peer detection control table according to the second embodiment of the invention.

FIG. 15 shows a dead peer detection control table 300 according to the second embodiment of the invention.

The dead peer detection control table 300 according to the second embodiment of the invention differs from that according to the first embodiment of the invention in that terminal status notify-flag 303, and notify-destination IP address 304 are additionally contained.

The terminal status notify-flag 303 is a flag for determining whether or not a connection status of MS 15 is to be notified to HSS 5. The notify-destination IP address 304 indicates the IP address of HSS 5 that is to be notified of the connection status of MS 15.

Next, there is described hereinafter a method for updating the session management table 400, and a method for exchanging the connection status of MS 15 at the time of failure in dead peer detection with reference to FIG. 17.

Figure 17:
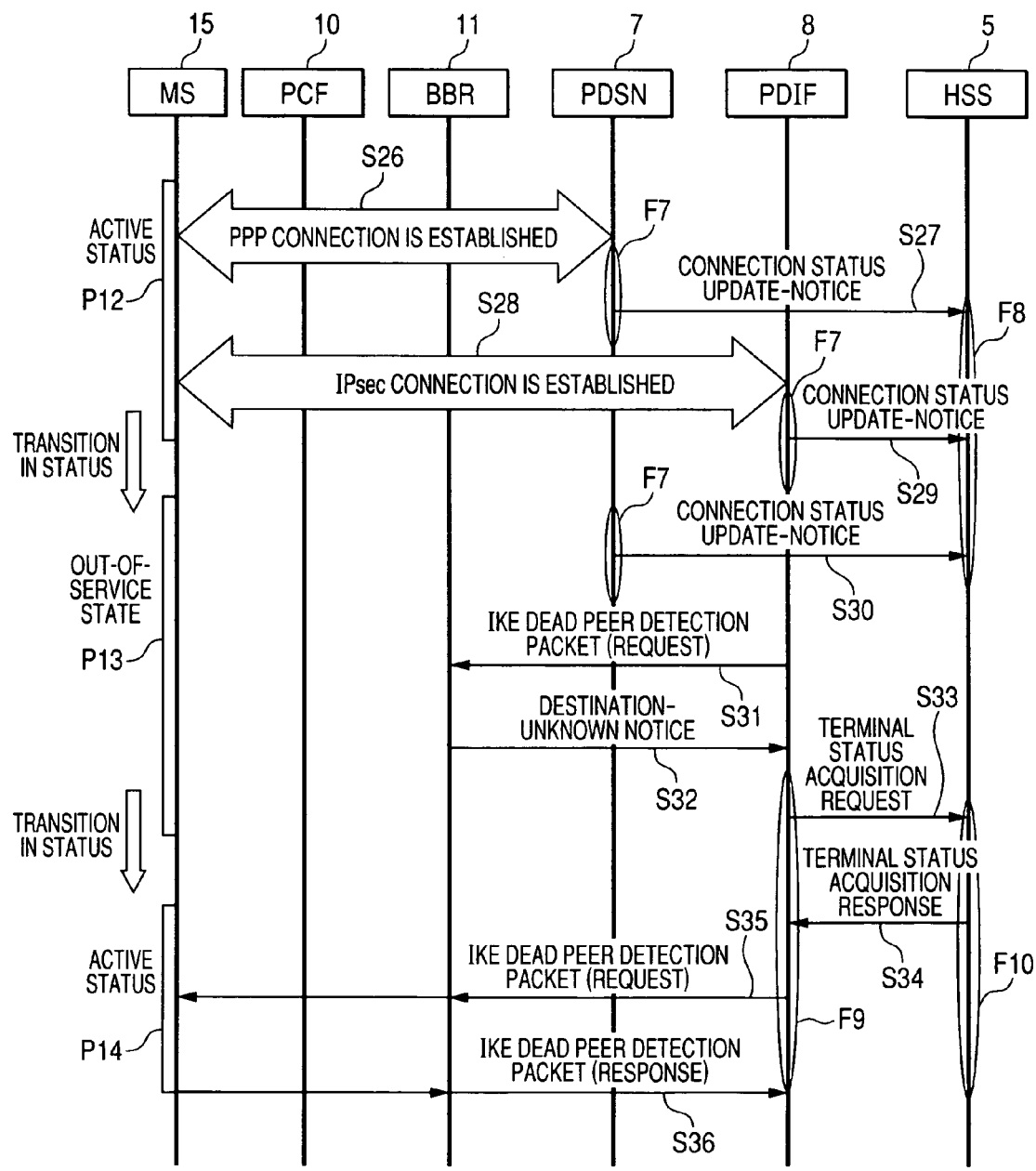
FIG. 17 is a view showing a sequence of steps for executing the dead peer detection control according to the second embodiment of the invention.

FIG. 17 is a view showing a sequence of steps for executing the dead peer detection control according to the second embodiment of the invention.

First, in the case where the power supply of MS 15 is turned ON (P12), the MS 15 establishes a session with PDSN 7 by use of PPP (S26). As the MS 15 is newly connected at this point in time, PDSN 7 updates the session management table 400. And PDSN 7 transmits a connection status update-notice to HSS 5 (step S27). Subsequently, HSS 5, after receiving the connection status update-notice from PDSN 7, updates the session management table 400 (F10). The MS 15 similarly establishes a session with PDIF 8 by use of IPsec (S28). As the MS 15 is newly connected at this point in time, PDIF 8 updates the session management table 200. And PDIF 8 transmits the connection status update-notice to HSS 5 (step S29). HSS 5, after receiving the connection status update-notice from PDIF 8, updates the session management table 400 (F10).

Next, in the case where both the interface between the MS 15, and the EVDO system, and the interface between the MS 15, and the WiFi system undergo transition to the out-of-service status, as shown in FIG. 8, the EVDO system is able to detect a wireless link status of the MS 15 by PCF 10 transmitting the paging notice, as previously described. Then, PDSN 7 transmits the connection status update-notice to HSS 5 on the basis of the wireless link status as detected (step S30).

On the other hand, since the WiFi system is unable to detect movement of MS 15 to an out-of-service area, PDIF 8 transmits a dead peer detection packet to the MS 15 by use of IKE after the elapse of a dead peer detection cycle (step S31). However, the dead peer detection packet does not reach the MS 15, so that the dead peer detection control fails. At this point in time, PDIF 8 does not immediately free a session, and executes processing for the dead peer detection control on the basis of "actions at the time of failure in the dead peer detection" of the dead peer detection control table 300 set by the administrator (P13).

Next, in the case where PDIF 8 changes the dead peer detection control at P13, thereby selecting "extension of a dead peer detection cycle", PDIF 8 transmits a terminal status acquisition request to HSS 5 (step S33). Then, PDIF 8 receives a response containing the connection status of MS 15 in another system from HSS 5 (step S34).

Next, PDIF 8, after the elapse of the dead peer detection cycle, transmits the dead peer detection packet to the MS 15 again (step S35). In the case of the MS 15 having undergone transition to the active status, PDIF 8 is able to receive a response packet from the MS 15 (step S36), so that it is possible to avoid wasteful freeing of the session.

Next, there is described hereinafter processing for PDSN 7 notifying HSS 5 of updating of the connection status with reference to FIG. 18.

Figure 18:
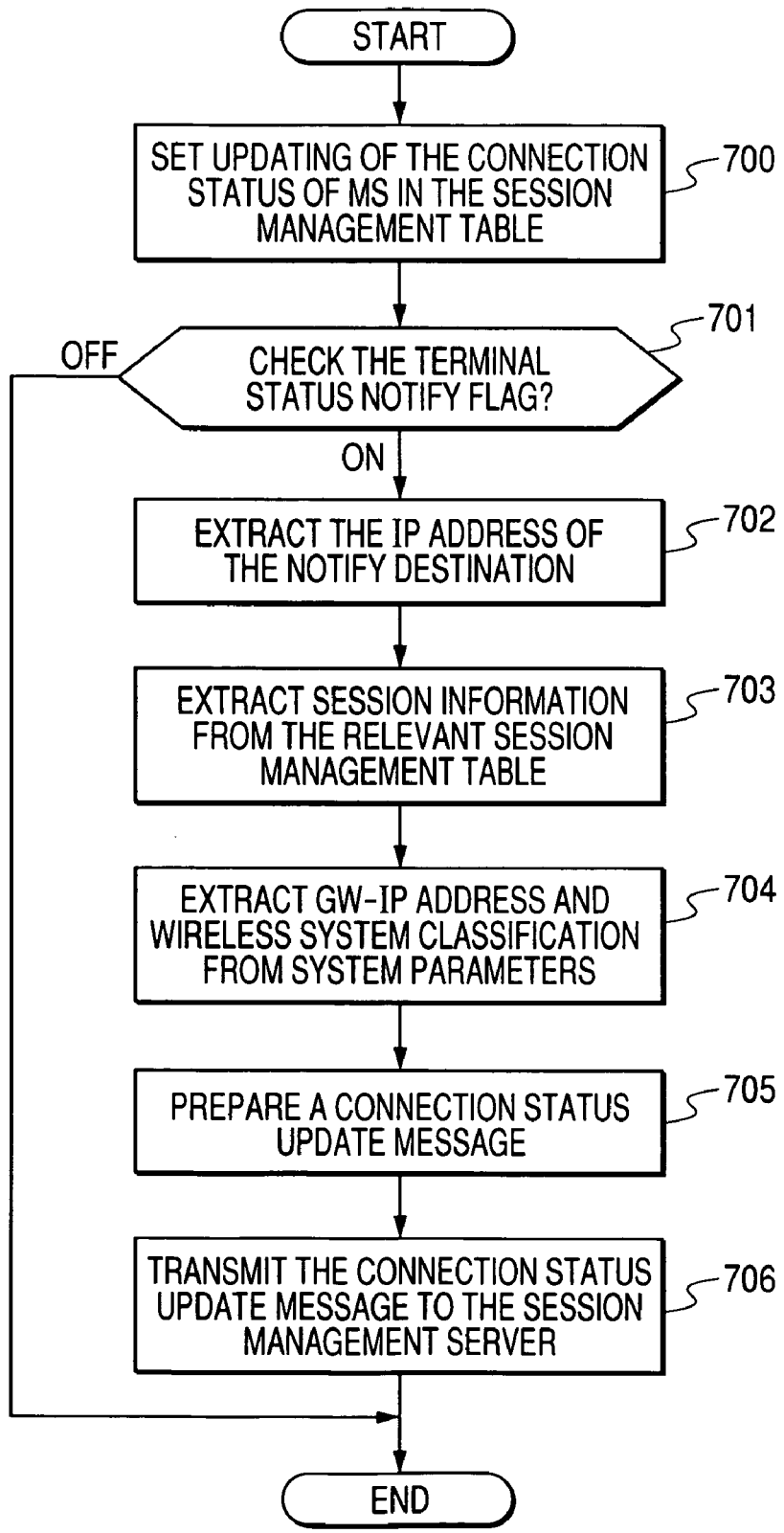
FIG. 18 is a flow chart showing processing for transmission of a connection status update-notice according to the second embodiment of the invention.

FIG. 18 is a flow chart showing the processing for transmission of the connection status update-notice according to the second embodiment of the invention.

First, PDSN 7 sets updating of the connection status of MS 15 in the session management table (100, or 200) (step 700).

Next, PDSN 7 checks the terminal status notify-flag 303 of the dead peer detection control table 300 (step 701). If the flag is OFF, PDSN 7 completes the processing without notifying HSS 5 of the connection status of the MS 15. On the other hand, if the flag is ON, PDSN 7 extracts the notify-destination IP address 304 from the dead peer detection control table 300 (step 702).

Next, PDSN 7 extracts the MS management identifier of the MS 15, the terminal IP address, and the terminal status from the session management table (100, or 200) (step 703). Then, PDSN 7 extracts the IP address of PDSN 7 itself, and the wireless system classification of PDSN 7 itself from system parameters (step 704).

Subsequently, PDSN 7 prepares a connection status update-message on the basis of information as extracted (step 705). And PDSN 7 transmits the connection status update-message as prepared to HSS 5 (step 706), thereby completing the processing. Now, the processing for transmitting the connection status update-notice with the use of PDSN 7 is described as above, however, the same applies to the case of using PDIF 8 instead.

Next, there is described hereinafter processing executed by HSS 5 at the time of HSS 5 receiving the connection status update-message with reference to FIG. 19.

Figure 19:
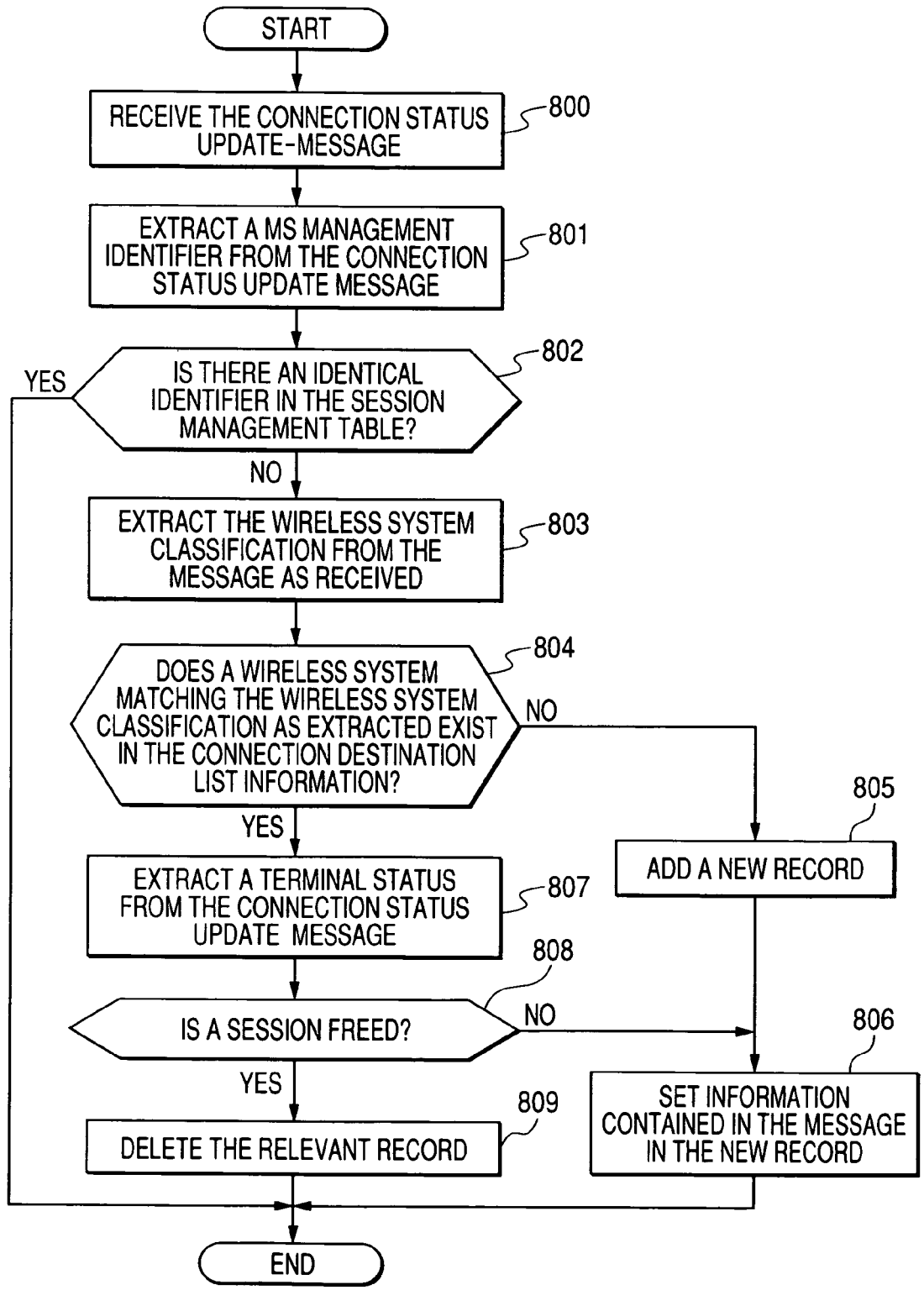
FIG. 19 is a flow chart showing processing executed at the time of receiving the connection status update-notice according to the second embodiment of the invention.

FIG. 19 is a flow chart showing the processing executed at the time of receiving the connection status update-notice according to the second embodiment of the invention.

First, HSS 5 receives the connection status update-message from PDSN 7 or PDIF 8 (step 800). Then, HSS 5 extracts the MS management identifier from the connection status update-message as received (step 801).

Next, HSS 5 searches the session management table 400 by use of the MS management identifier as extracted to find out if there exists an identifier identical thereto (step 802). If the MS management identifier as extracted is contained in the record of the session management table 400, HSS 5 completes the processing. On the other hand, if the MS management identifier as extracted is not contained in the record of the session management table 400, the processing proceeds to step 803.

Then, HSS 5 extracts the wireless system classification from the connection status update-message as received (the step 803). Then, HSS 5 determines whether or not the wireless system classification as extracted exists in the connection destination list information within the record of the relevant MS management identifier in the step 802 (step 804). If no, the processing proceeds to step 805. If the wireless system classification as extracted does not exist in the connection destination list information in the step 804, HSS 5 adds a new record to the session management table 400 (the step 805). Then, HSS 5 sets various information contained in the connection status update-message as received in the record as newly added (step 806), thereby completing the processing.

On the other hand, if the wireless system classification as extracted exists in the connection destination list information, the processing proceeds to step 807. If the wireless system classification as extracted exists in the connection destination list information in the step 804, HSS 5 extracts the terminal status from the connection status update-message as received (the step 807).

Next, HSS 5 determines whether or not a session is freed on the basis of the terminal status as extracted (step 808). If the session is freed, HSS 5 deletes the relevant record (step 809), thereby completing the processing. On the other hand, if the session is not freed, the processing proceeds to the step 806, and HSS 5 sets the various information contained in the connection status update-notice as received to the relevant record, thereby completing the processing.

Now, referring to FIG. 20, there is described hereinafter processing for changing the dead peer detection control in accordance to the actions at the time of failure in the dead peer detection, as set by the administrator, in the case of PDIF 8 failing in the dead peer detection in carrying out the second embodiment of the invention.

Figure 20:
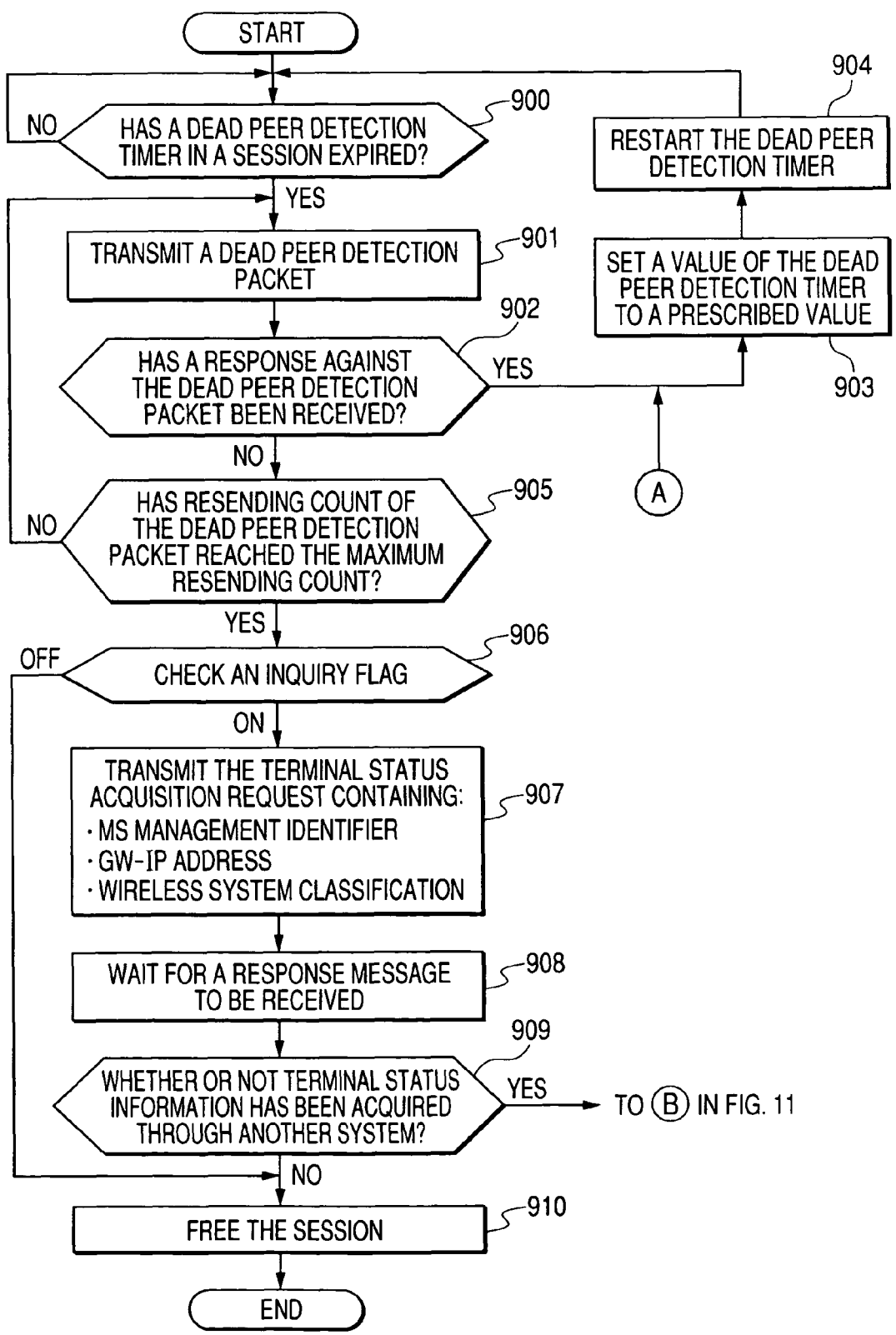
FIG. 20 is a flow chart showing processing for changing dead peer detection control according to the second embodiment of the invention.

FIG. 20 is a flow chart showing processing for changing the dead peer detection control according to the second embodiment of the invention.

First, PDIF 8 refers to the Life Time 204 of the session management table 200 to thereby determine whether or not the dead peer detection timer in a session indicates the elapse of time set in the Life Time 204 (step 900). If the dead peer detection timer indicates the elapse of the time set in the Life Time 204, the processing proceeds to step 901. On the other hand, if the dead peer detection timer does not indicate the elapse of the time set in the Life Time 204, PDIF 8 checks the dead peer detection timer in the next session.

Next, PDIF 8 transmits a dead peer detection packet to MS 15 (the step 901). Then, PDIF 8 determines whether or not a response to the dead peer detection packet is received from the MS 15 (step 902). If the response is received from the MS 15, the processing proceeds to step 903. On the other hand, if the response cannot be received from the MS 15, the processing proceeds to step 905.

Next, PDIF 8 sets a value of the dead peer detection timer to the value of the Life Time 204, set in the session management table 200, in the step 903. Subsequently, PDIF 8 restarts the dead peer detection timer, thereby checking the dead peer detection timer in the next session (step 904).

Next, PDIF 8, after transmission of the dead peer detection packet, determines whether or not the resending count of the dead peer detection packet has reached the maximum resending count number (the step 905). If not, the processing reverts to the step 901, and PDIF 8 transmits the dead peer detection packet again. On the other hand, if there sending count of the dead peer detection packet has reached the maximum resending count number, the processing proceeds to step 906.

Subsequently, PDIF 8 determines that the processing for the dead peer detection control has failed, thereby checking the inquiry flag 301 of the dead peer detection control table 300 (the step 906). If the inquiry flag is set OFF, the processing proceeds to step 910, and PDIF 8 frees the session with the MS 15 (the step 910), thereby completing the processing. On the other hand, if the inquiry flag is set ON, the processing proceeds to step 907.

Next, PDIF 8 extracts the IP address 302 as the reference for an inquiry of the dead peer detection control table 300, the MS management identifier 201 of the session management table 200, the TP address of PDIF 8 itself, and the wireless system classification of PDIF 8 itself. Then, PDIF 8 transmits the terminal status acquisition request containing various information items as extracted to HSS 5 (the step 907).

Subsequently, PDIF 8 waits for receipt of a response message to the terminal status acquisition request from HSS 5 (step 908). Then, after receipt of the response to the terminal status acquisition request from HSS 5, PDIF 8 determines whether or not information on the terminal status has been acquired through another system (step 909). If the information on the terminal status has not been acquired, the processing proceeds to step 910, whereupon PDIF 8 frees the session with the MS 15, thereby completing the processing. On the other hand, if the information on the terminal status has been acquired, the processing proceeds to the step 511 shown in FIG. 11, and PDIF 8 checks the Action corresponding to the information on the terminal status, as acquired. The steps of the processing thereafter are the same as those according to the first embodiment of the invention, shown in FIG. 11, and are therefore omitted.

Now, there is described hereinafter processing executed at the time of HSS 5 receiving the terminal status acquisition request from PDIF 8 with reference to FIG. 21.

Figure 21:
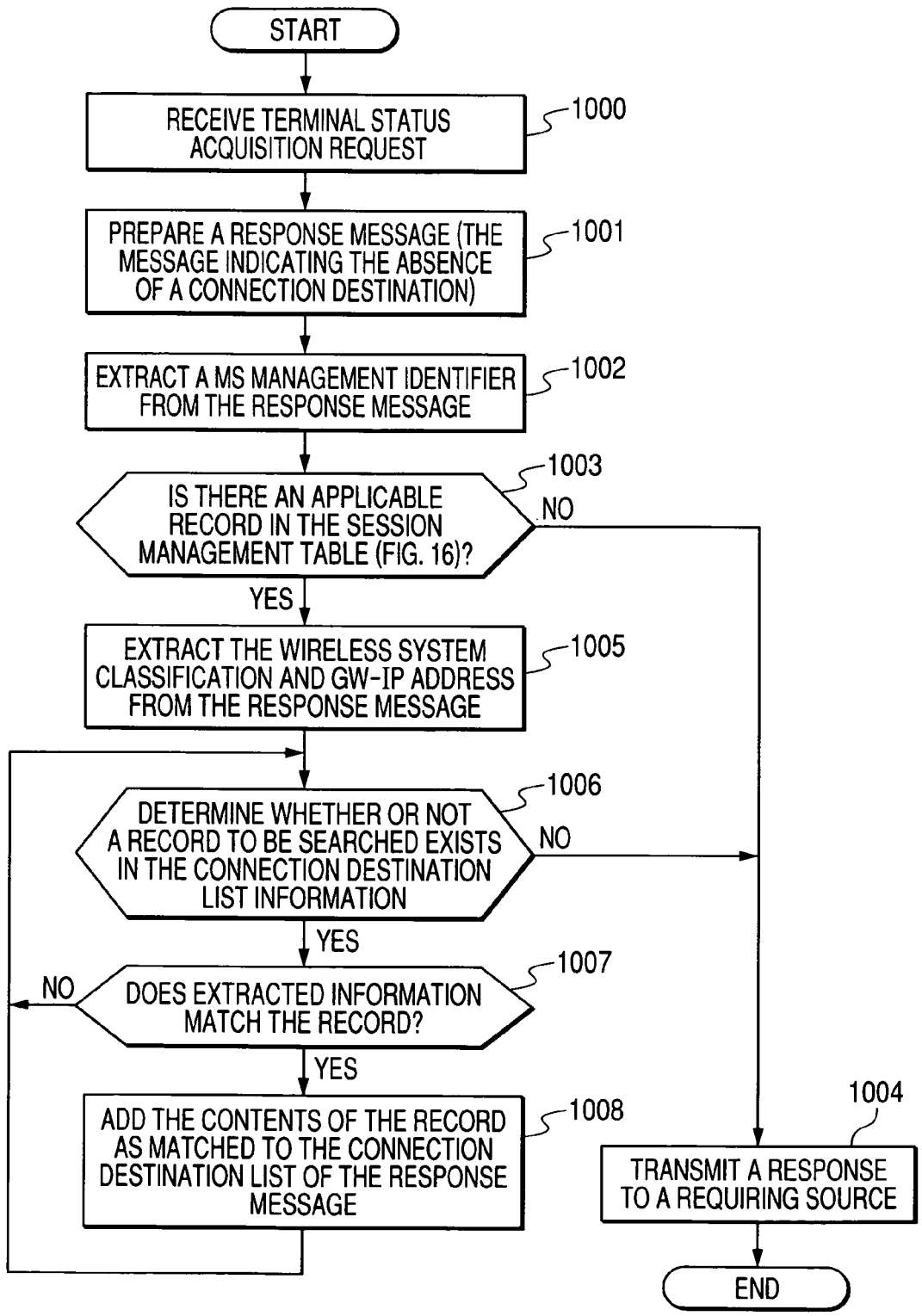
FIG. 21 is a flow chart showing response processing by HSS according to the second embodiment of the invention.
Figure 22:
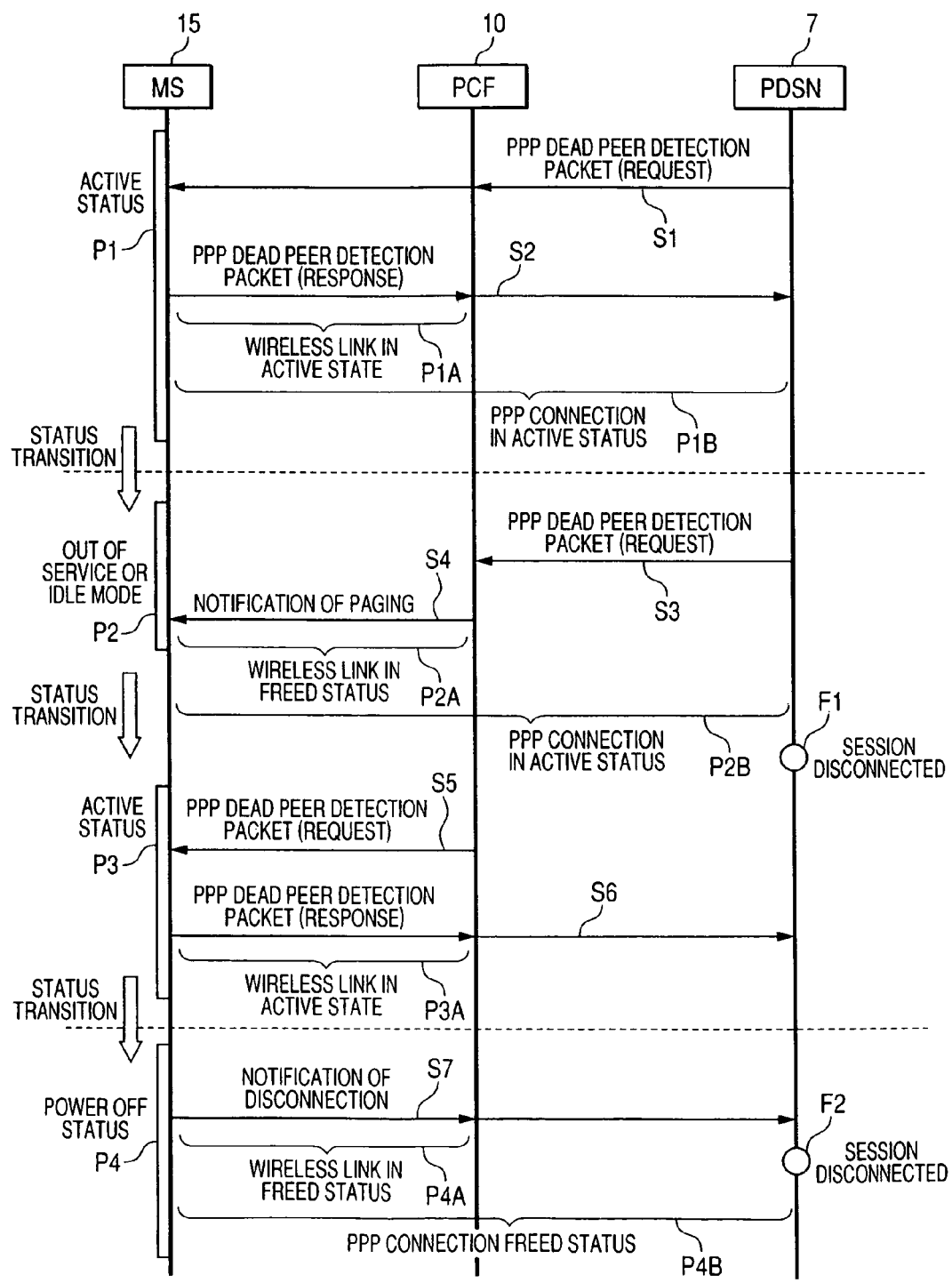
FIG. 22 is a view showing a sequence of steps of a procedure for dead peer detection in a conventional cellular wireless system.

FIG. 21 is a flow chart showing processing for response by HSS 5 according to the second embodiment of the invention.

First, HSS 5 receives the terminal status acquisition request from PDIF 8 (step 1000). Next, HSS 5 prepares a response message to be transmitted to PDIF 8 (step 1001). At this point in time, HSS 5 stores information indicating non-presence of a connection destination in the response message.

Next, HSS 5 extracts a MS management identifier from the terminal status acquisition request as received (step 1002). Then, HSS 5 refers to the record of the session management table 400 by use of the MS management identifier as extracted, thereby determining whether or not there exists a MS management identifier that matches up with the MS management identifier as extracted (step 1003). If a matching MS management identifier does not exist, HSS 5 transmits a response message storing the information indicating the non-presence of the connection destination to PDIF 8 (step 1004), thereby completing the processing. On the other hand, if the matching MS management identifier exists, HSS 5 extracts the wireless system classification and the TP address of an access gateway from the terminal status acquisition request (step 1005).

Next, HSS. 5 determines whether or not a record to be searched exists in the connection destination list information 402 of the session management table 400 (step 1006). If the record to be searched does not exist, the processing proceeds to the step 1004, and HSS 5 transmits the response message to PDIF 8, thereby completing the processing. If the record to be searched exists, the processing proceeds to the step 1007.

Subsequently, HSS 5 determines whether or not the wireless system classification and the TP address of the access gateway, extracted in the step 105, match up with the record of the connection destination list information 402 of the session management table 400 (the step 1007). If extracted information does not match the record, the processing reverts to the step 1006, and HSS 5 searches connection destination list information in the next record. On the other hand, if the extracted information matches the record, the processing proceeds to step 1008.

Next, HSS 5 adds the content of the record matched in the step 1007 to the connection destination list of the response message (step 1008), and the processing reverts to step 1006, where upon HSS 5 searches the connection destination list information in the next record.

Further, it is to be pointed out that with the second embodiment of the invention, HSS serving as the session management server is described, however, the same function may be implemented by other devices (for example HA 4). Furthermore, the same function may be implemented by a device provided only with the function of the session management server.

What is claimed is:

1. A method for dead peer detection of a mobile terminal to be executed in a mobile communications system including a mobile terminal connected to a plurality of wireless systems, a first connection device terminating a first wireless system with access points managing a connection status of a first wireless link between the mobile terminal and the first wireless system, and a second connection device terminating a second wireless system with access points not managing a connection status of a second wireless link between the mobile terminal and the second wireless system, said method comprising the steps of:

the second connection device acquiring the connection status of the first wireless link between the mobile terminal and the first wireless system from the first connection device; and the second connection device changing a dead peer detection control process on the basis of the connection status of the first wireless link, as acquired.

2. The method for dead peer detection of a mobile terminal according to claim 1, further comprising the steps of:

the second connection device transmitting a dead peer detection packet to the mobile terminal at a predetermined cycle;

the second connection device transmitting a idle release packet to the mobile terminal via the first connection device if there is no response from the mobile terminal against the dead peer detection packet, thereby causing the mobile terminal to undergo transition from a idle mode status to an active status; and the second connection device transmitting the dead peer detection packet to the mobile terminal again.

3. The method for dead peer detection of a mobile terminal according to claim 1, wherein the monitoring control process includes at lest one method among respective methods according to:

a process for freeing a session between the mobile terminal and the second connection device, a process for connecting the session between the mobile terminal and the second connection device, a process for extending a transmission cycle of a dead peer detection packet to be transmitted to the mobile terminal, and a process for causing the mobile terminal to undergo transition to an active status before transmitting the dead peer detection packet.

4. The method for dead peer detection of a mobile terminal according to claim 1, wherein the second connection device transmits a dead peer detection packet to the mobile terminal at a predetermined cycle, making a request to an administrator for setting of the dead peer detection control process if there is no response from the mobile terminal against the dead peer detection packet.

5. A method for dead peer detection of a mobile terminal, to be executed in a mobile communications system including a mobile terminal connected to a plurality of wireless systems, a first connection device terminating a first wireless system with access points managing a connection status of a first wireless link between the mobile terminal and the first wireless system, a second connection device terminating a second wireless system with access points not managing a connection status of a second wireless link between the mobile terminal and the second wireless system, and a session management server for managing a connection status between the mobile terminal and each of the wireless systems, said method comprising the steps of:

the first connection device and the second connection device notifying the session management server of a connection status between the mobile terminal and the first wireless system and the second wireless system respectively;

the session management server managing the connection status as notified; and the second connection device acquiring the connection status of the first wireless link between the mobile terminal and the first wireless system from the session management server to thereby change a dead peer detection control process on the basis of the connection status of the first wireless link, as acquired.

6. A connection device serving as a first connection device terminating a wireless LAN system contained in a mobile communications system, said mobile communications system being having a second connection device terminating a second wireless system with access points managing a connection status of a wireless link between a mobile terminal and a plurality of wireless systems, wherein the first connection device acquires the connection status of the wireless link between the mobile terminal and the second wireless system terminated by the second connection device from the second connection device to thereby execute a dead peer detection control process on the basis of the connection status of the wireless link, as acquired.

7. The connection device according to claim 6, wherein the second connection device transmits a dead peer detection packet to the mobile terminal at a predetermined cycle, transmitting an idle release packet to the mobile terminal via the first connection device if there is no response from the mobile terminal against the dead peer detection packet, thereby causing the mobile terminal to undergo transition from an idle mode status to an active status before transmitting the dead peer detection packet to the mobile terminal again.

8. The connection device according to claim 6, wherein the dead peer detection control process includes at lest one method among respective methods according to a process for freeing a session between the mobile terminal and the second connection device, a process for connecting the session between the mobile terminal and the second connection device, a process for extending a transmission cycle of a dead peer detection packet to be transmitted to the mobile terminal, and a process for causing the mobile terminal to undergo transition to an active status before transmitting the dead peer detection packet.

9. The connection device according to claim 6, wherein the second connection device transmits a dead peer detection packet to the mobile terminal at a predetermined cycle, making a request to an administrator for setting of the monitoring control process if there is no response from the mobile terminal against the dead peer detection packet.

10. A connection device serving as a first connection device terminating a wireless LAN system included in a mobile communications system, wherein said mobile communications system includes:

a mobile terminal connected to a plurality of wireless systems;

a second connection device terminating a second wireless system with access points not managing a connection status between the mobile terminal and a wireless link; and a session management server for managing a connection status between the mobile terminal and each of the wireless systems, wherein the first connection device and the second connection device notify the session management server of a connection status of the mobile terminal, wherein the session management server manages the connection status as notified, and wherein the second connection device acquires the connection status of the mobile terminal in the first wireless system from the session management server to thereby change a dead peer detection control process on the basis of the connection status of the mobile terminal, as acquired.

11. A mobile communications system comprising:
a mobile terminal connected to a plurality of wireless systems;
a first connection device terminating a first wireless system with access points managing a connection status of a first wireless link between the mobile terminal and the first wireless system; and
a second connection device terminating a second wireless system with access points not managing a connection status of a second wireless link between the mobile terminal and the second wireless system,
wherein the second connection device acquires the connection status of the first wireless link between the mobile terminal and the first wireless system from the first connection device, changing a dead peer detection control process on the basis of the connection status of the first wireless link, as acquired.

12. The mobile communications system according to claim 11, wherein the second connection device transmits a dead peer detection packet to the mobile terminal at a predetermined cycle, transmitting a idle release packet to the mobile terminal via the first connection device if there is no response from the mobile terminal against the dead peer detection packet, thereby causing the mobile terminal to undergo transition from a idle mode status to an active status before transmitting the dead peer detection packet to the mobile terminal again.

13. The mobile communications system according to claim 11, wherein the monitoring control process includes at lest one method among respective methods according to:
a process for freeing a session between the mobile terminal and the second connection device, a process for connecting the session between the mobile terminal and the second connection device, a process for extending a transmission cycle of a dead peer detection packet to be transmitted to the mobile terminal, and a process for causing the mobile terminal to undergo transition to an active status before transmitting the dead peer detection packet.

14. The mobile communications system according to claim 11, wherein the second connection device transmits a dead peer detection packet to the mobile terminal at a predetermined cycle, making a request to an administrator for setting of the monitoring control process if there is no response from the mobile terminal against the dead peer detection packet.

15. A mobile communications system comprising:
a mobile terminal connected to a plurality of wireless systems;
a first connection device terminating a first wireless system with access points managing a connection status of a first wireless link between the mobile terminal and the first wireless system;
a second connection device terminating a second wireless system with access points not managing a connection status of a second wireless link between the mobile terminal and the second wireless system; and
a session management server for managing a connection status between the mobile terminal and each of the wireless systems,
wherein the first connection device and the second connection device notify the session management server of a connection status between the mobile terminal and the first wireless system and the second wireless system respectively,
wherein the session management server manages the connection status as notified, and
wherein the second connection device acquires the connection status of the first wireless link between the mobile terminal and the first wireless system from the session management server to thereby change a dead peer detection control process on the basis of the connection status of the first wireless link, as acquired.

* * * * *